United States Patent
Lele et al.

(10) Patent No.: US 12,174,659 B2
(45) Date of Patent: Dec. 24, 2024

(54) FSM BASED CLOCK SWITCHING OF ASYNCHRONOUS CLOCKS

(71) Applicant: TEXAS INSTRUMENTS INCORPORATED, Dallas, TX (US)

(72) Inventors: Atul Ramakant Lele, Bangalore (IN); Dirk Preikszat, Freising (DE); Gregory North, Austin, TX (US); Robin Osa Hoel, Oslo (NO); Tarjei Aaberge, Nesoya (NO)

(73) Assignee: Texas Instruments Incorporated, Dallas, TX (US)

( * ) Notice: Subject to any disclaimer, the term of this patent is extended or adjusted under 35 U.S.C. 154(b) by 233 days.

(21) Appl. No.: 17/824,695

(22) Filed: May 25, 2022

(65) Prior Publication Data
US 2023/0384820 A1    Nov. 30, 2023

(51) Int. Cl.
G06F 1/10  (2006.01)
G06F 1/08  (2006.01)
G06F 1/12  (2006.01)

(52) U.S. Cl.
CPC .................. *G06F 1/12* (2013.01); *G06F 1/08* (2013.01); *G06F 1/10* (2013.01)

(58) Field of Classification Search
CPC .................. G06F 1/10; G06F 1/26; G06F 1/08
See application file for complete search history.

(56) References Cited

U.S. PATENT DOCUMENTS

| | | | | |
|---|---|---|---|---|
| 6,194,940 B1* | 2/2001 | Hunter | ................ | G06F 9/30083 |
| | | | | 712/E9.032 |
| 6,809,556 B1* | 10/2004 | Bronfer | ..................... | G06F 1/08 |
| | | | | 327/99 |
| 6,819,150 B1* | 11/2004 | Santosa | ................... | G06F 1/324 |
| | | | | 327/144 |
| 9,740,234 B1* | 8/2017 | Kim | ......................... | G06F 1/04 |
| 2003/0184347 A1* | 10/2003 | Haroun | ..................... | G06F 1/08 |
| | | | | 327/99 |

(Continued)

FOREIGN PATENT DOCUMENTS

EP    2549354 A2    1/2013

OTHER PUBLICATIONS

International Search Report in corresponding PCT Patent Application No. PCT/US2023/022208, mailed Sep. 25, 2023 (4 pages).

*Primary Examiner* — Phil K Nguyen
(74) *Attorney, Agent, or Firm* — Xianghui Huang; Frank D. Cimino

(57) ABSTRACT

Aspects of the disclosure provide for an apparatus. In an example, the apparatus includes a clock switching circuit coupled to oscillators and one or more circuit units. The clock switching circuit is configured to receive, from the oscillators, a set of frequency signals, provide an uplink primary clock signal and an enable signal to the one or more circuit units, the enable signal determined synchronously with the uplink primary clock signal, receive, from the one or more circuit units or a clock management circuit, a clock frequency request, provide the uplink primary clock signal based on a first signal of the set of frequency signals, and according to the clock frequency request, determining whether to continue to provide the uplink primary clock signal based on the first signal or on a second signal of the set of frequency signals.

20 Claims, 10 Drawing Sheets

(56) References Cited

U.S. PATENT DOCUMENTS

| | | | |
|---|---|---|---|
| 2005/0270073 A1* | 12/2005 | Lee | G06F 1/08 |
| | | | 327/99 |
| 2009/0319814 A1* | 12/2009 | Pastorello | G11C 17/146 |
| | | | 713/400 |
| 2013/0043905 A1* | 2/2013 | Langadi | H03K 5/19 |
| | | | 326/93 |
| 2013/0198539 A1* | 8/2013 | Furuya | G06F 11/0721 |
| | | | 713/502 |
| 2014/0035635 A1* | 2/2014 | Rao | G06F 1/12 |
| | | | 327/144 |
| 2016/0041578 A1* | 2/2016 | Lee | G06F 1/12 |
| | | | 327/146 |
| 2020/0201412 A1* | 6/2020 | Felix | G06F 1/324 |
| 2021/0034095 A1 | 2/2021 | Lele et al. | |
| 2022/0019257 A1* | 1/2022 | Chambers | G06F 1/06 |

\* cited by examiner

FSM BASED CLOCK SWITCHING OF ASYNCHRONOUS CLOCKS

BACKGROUND

A system on a chip (SoC) or a microcontroller unit (MCU), which includes a combination of a processor, memory, and other hardware components, is an embedded system that has dedicated functions. An embedded system can be part of a computer or an electronic device, such as a chip or an electronic circuit board. An embedded system can include multiple circuit units, which may include various intellectual property (IP). The circuit units are also referred to herein as IPs. For example, designers of application-specific integrated circuits (ASICs) and systems of field-programmable gate array (FPGA) logic integrate IPs as building blocks in embedded systems. The IPs include multiple circuit elements including clock generators that provide clock signals for synchronizing signals and operations within and across the IPs of an embedded system.

SUMMARY

In some examples, an apparatus includes a clock switching circuit coupled to oscillators and one or more circuit units. The clock switching circuit is configured to receive, from the oscillators, a set of frequency signals, provide an uplink primary clock signal and an enable signal to the one or more circuit units, the enable signal determined synchronously with the uplink primary clock signal, receive, from the one or more circuit units or a clock management circuit, a clock frequency request, provide the uplink primary clock signal based on a first signal of the set of frequency signals, and according to the clock frequency request, determining whether to continue to provide the uplink primary clock signal based on the first signal or on a second signal of the set of frequency signals.

In some examples, a method includes receiving, by a clock management circuit, a clock frequency request from a circuit unit for a clock signal having a first frequency. The method also includes determining, by the clock management circuit based on the clock frequency request, to provide an uplink primary clock signal based on a first clock frequency signal from among a set of clock frequency signals, the first clock frequency signal having the first frequency. The method also includes receiving, by the clock management circuit, a second clock frequency request from a second circuit unit for a second clock signal having a second frequency. The method also includes, responsive to the second frequency being less than the first frequency, determining, by the clock management circuit based on the second clock frequency request, to continue providing the uplink primary clock signal based on the first clock frequency signal. The method also includes, responsive to the second frequency being greater than the first frequency, determining, by the clock management circuit based on the second clock frequency request, to provide the uplink primary clock signal based on a second clock frequency signal from among the set of clock frequency signals, the second clock frequency signal having the second frequency. The method also includes providing the uplink primary clock signal and an enable signal to the circuit unit and the second circuit unit, the enable signal provided synchronously with the uplink primary clock signal.

In some examples, an apparatus includes a clock switching circuit and a finite state machine (FSM). The FMS is configured to configured to provide first control signals to the clock switching circuit for state transitions that determine switching an uplink primary clock signal from a first clock frequency signal to a second clock frequency signal or a third clock frequency signal, the first clock frequency signal having a faster clock frequency than the second clock frequency signal, and the third clock frequency signal having a slower clock frequency than the second clock frequency signal. The FSM is also configured to provide second control signals to the clock switching circuit to provide a second clock frequency enable signal and a third clock frequency enable signal with the uplink primary clock signal, the second clock frequency enable signal and the third clock frequency enable signal generated synchronously with the uplink primary clock signal.

DETAILED DESCRIPTION

Embedded systems, such as SoCs and MCUs, can include IPs that operate at different clock frequencies. The clock frequencies can be provided to the IPs as clock signals by different clock generators, also referred to herein as oscillators. Providing different clock frequencies from different oscillators reduces power usage in the SoC, such as to meet certain power constraints. The same IP may also perform operations at different clock frequencies. However, issues may arise exchanging signals across clock boundaries. For example, IPs that operate at different clock frequencies generated by different oscillators cannot interact in a synchronous manner. Clock switching schemes based on combinational logic to change the clock frequency for an IP can introduce glitches in the clock signal, such as due to mistiming the switching according to the cycles among the different clock frequencies. More complex clock switching schemes including synchronizers can also introduce latency due to the IP waiting for a period of time before switching the clock frequency, such as in the case of switching from a lower clock frequency to a higher clock frequency or vice-versa.

The description provides examples of schemes for switching clock frequencies for a clock signal provided to an IP to avoid signal timing glitches and reduce latency. The schemes include circuits, systems, and methods to perform clock switching between two or more clock frequencies from one or more respective oscillators. Accordingly, one or more IPs in the system are provided the same output clock signal and one or more clock enable signals for use in generating and synchronizing internal clocks based on the received clock signal. For example, the IPs may be enabled to generate internal clocks according to the output clock signal and one of the clock enable signals through implementation of an integrated clock gate (ICG). The clock frequency of the output clock signal is determined by a finite state machine (FSM) coupled to a multiplexer for selecting a clock frequency from available clock frequencies provided by the oscillators. To mitigate the presence of glitches in the output clock signal provided to the IP, the clock frequency of the output clock signal provided to the IP based on control of the FSM may not be a clock frequency requested by the IP, but may be switched by the IP to the clock frequency requested by the IP based on a clock enable signal provided based on control of the FSM and received synchronously with the output clock signal.

Figure 1:
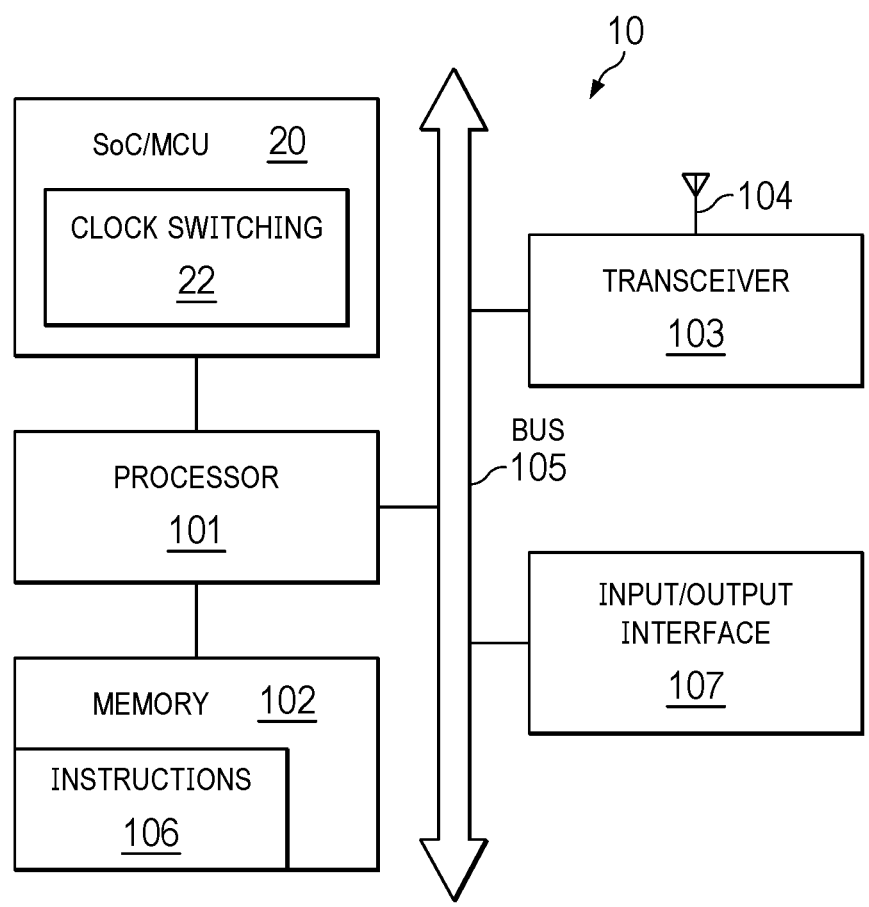
FIG. 1 is a block diagram of a processing system, in accordance with various examples.

FIG. 1 is a block diagram of a processing system 10 configured according to software, hardware, or both, to perform clock switching according to the various examples of the description. The processing system 10 includes hardware components that may be coupled to or part of a chip or an embedded system, such as a SoC or MCU in a device, including IPs that operate at different clock frequencies. The processing system 10 may also execute computer programs or instructions to perform the clock switching. For example, the processing system 10 includes a SoC or MCU (SoC/MCU) 20 with a clock switching circuit 22 that performs the clock switching according to the various examples of the description. As shown in FIG. 1, the processing system 10 also includes one or more processors 101 and one or more memories 102. The one or more processors 101 are coupled to or include the SoC/MCU 20. In some examples, the processing system 10 may also include one or more transceivers 103 for establishing connections. These components may be connected through a bus 105 or in any other suitable manner. In FIG. 1, an example in which the components are connected through a bus 105 is shown.

The processor 101 is configured to read and execute computer-readable instructions. For example, the processor 101 is configured to invoke and execute instructions in a program stored in the memory 102, including instructions 106. In some examples, the instructions 106, when executed, implement a FSM. Responsive to the processor 101 providing data, the processor 101 drives or controls the transceiver 103 to perform the transmission of the data. The processor 101 also drives or controls the transceiver 103 to perform receiving, responsive to the processor 101 receiving data. Therefore, the processor 101 may be considered as a control center for performing transmitting or receiving of data, and the transceiver 103 is an executor for performing the transmitting and receiving operations.

In some examples, the memory 102 is coupled to the processor 101 through the bus 105 or an input/output interface 107. In other examples, the memory 102 is integrated with the processor 101. The memory 102 is configured to store various software programs and/or multiple groups of instructions, including the instructions 106. The memory 102 may include one or more storage devices. For example, the memory 102 includes a high-speed random-access memory and/or may include a nonvolatile memory such as one or more disk storage devices, a flash memory, or another nonvolatile solid-state storage device. The memory 102 may store an operating system such as a real-time operating system (RTOS), ANDROID, IOS, WINDOWS or LINUX. The memory 102 may further store a network communications program. The network communications program is useful for performing communications with one or more attached devices, one or more user equipments or one or more network devices. The memory 102 may further store a user interface program. The user interface program displays content of an application through a graphical interface and receive data or an operation performed by a user on the application via an input control such as a menu, a dialog box, or a physical input device (not shown). The memory 102 is configured to store the instructions 106 for performing the various methods and processes provided in accordance with the various examples of this description.

The transceiver 103 includes a transmitter and a receiver. The transceiver 103 is configured to transmit a signal that is provided by the processor 101. The transceiver 103 is also configured to receive a signal from other devices or equipments. The processing system 10 may also be provided with a wired network interface or a local area network (LAN) interface to support wired communication. The processing system 10 may also include communication components to transmit and receive wireless communication signals.

The processing system 10 may further include an input/output interface 107 for enabling communications between the processing system 10 and one or more input/output devices (not shown). Examples of the input/output devices include an audio input/output device, a key input device, a display and the like. The input/output devices are configured to perform interaction between the processing system 10 and a user or an external environment. The input/output device communicates with the processor 101 through a user interface.

Figure 2:
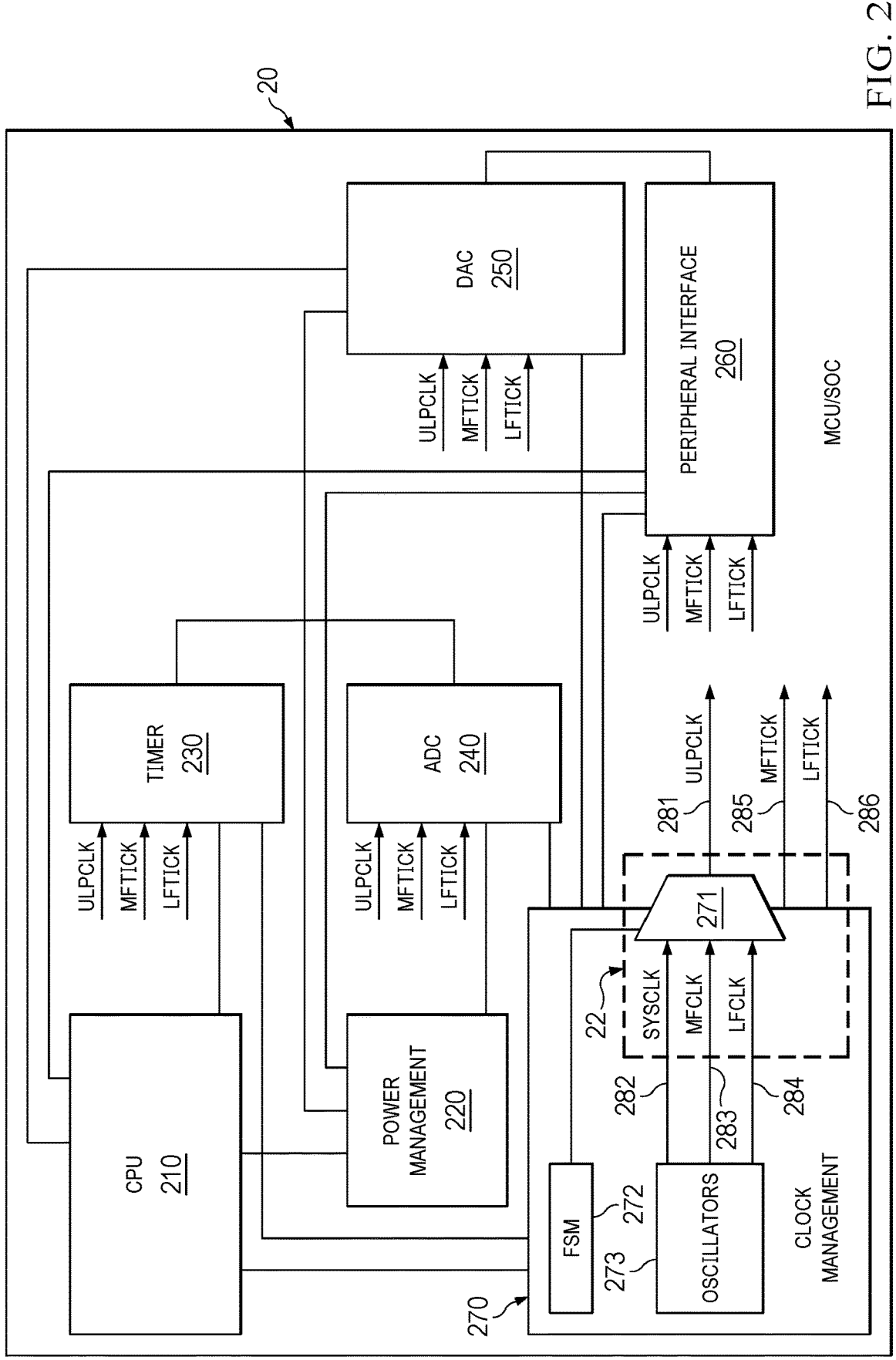
FIG. 2 is a block diagram of a SoC or MCU with a clock switching circuit, in accordance with various examples.

FIG. 2 is a block diagram of the SoC/MCU 20 with the clock switching circuit 22, in accordance with various examples. The SoC/MCU 20 is configured to operate using a clock signal that may have one of various different clock frequencies that may change during operation. For example, the SoC/MCU 20 may be coupled to or part of the processing system 10, such as a computer or electronic device. The SoC/MCU 20 includes a central processing unit (CPU) 210, which may be one of the IPs of the SoC/MCU 20. The CPU 210 is coupled to and configured to control (e.g., via signaling) the operations of other IPs of the SoC/MCU 20. The SoC/MCU 20 may also include a power management circuit 220 for providing and regulating power to the IPs and other components of the SoC/MCU 20. The IPs of the SoC/MCU 20 include a timer 230, an analog-to-digital converter (ADC) 240, a digital-to-analog converter (DAC) 250, and one or more peripheral interfaces 260. Examples of the peripheral interfaces 260 include a serial peripheral interface (SPI), a universal asynchronous receiver-transmitter (UART), and an inter-integrated circuit (I2C). At least some of the IPs and the other components of the SoC/MCU 20 may be coupled to each other. For example, the timer 230 is coupled to and exchange signals with the ADC 240, the DAC 250, and the one or more peripheral interfaces 260. The ADC 240 and the DAC 250 may also be coupled to and exchange signals with the one or more peripheral interfaces 260.

The SoC/MCU 20 also includes a clock management circuit 270 that provides the IPs of the SoC/MCU 20 with a clock signal that has a frequency selected from a set of available clock frequencies. For example, the clock management circuit 270 provides an uplink primary clock signal (ULPCLK) 281 to one or more IPs, including at least one of the timer 230, the ADC 240, the DAC 250, and the one or more peripheral interfaces 260. ULPCLK 281 may have a selectable frequency, and the clock management circuit 270 includes the clock switching circuit 22 which switches the clock frequency of ULPCLK 281 according to a request from an IP. The clock switching circuit 22 includes a clock frequency selection circuit 271 which selects the clock frequency of ULPCLK 281 from multiple clock frequencies provided by respective oscillators 273. The clock management circuit 270 also includes a FSM 272 coupled to the clock switching circuit 22. The FSM 272 provides control signals to the clock frequency selection circuit 271 to switch the clock frequency of ULPCLK 281 to the IPs. The connection to provide ULPCLK 281 from the clock management circuit 270 to each of the timer 230, ADC 240, DAC 250, and one or more peripheral interfaces 260 is shown with respective arrows in FIG. 2. The request from the IPs, including the timer 230, ADC 240, DAC 250, and one or more peripheral interfaces 260, may be provided to the clock management circuit 270 through the same connection or other connections (not shown).

In at least some examples, the clock signal provided to the IPs by the clock management circuit 270 has a frequency other than a frequency requested by a respective IP that receives the clock signal. For example, a first IP may request a clock signal at a first frequency and a second IP may request a clock signal at a second frequency that is less than the first frequency. The clock management circuit 270 may provide a clock signal to both the first and the second IP that has the first frequency. The clock management circuit 270 may also provide a clock enable signal to the first IP and the second IP. Based on the clock signal and the clock enable signal, the second IP may derive or otherwise generate an internal clock signal at the second frequency. In some implementations, the second IP generates the internal clock signal via an ICG that gates the clock signal according to the clock enable signal to provide the internal clock signal. In this way, both the first IP and the second IP may receive the same clock signal, but derive internal clock signals that are at their respective requested frequencies. This may facilitate interoperability among the first IP and the second IP, alleviating at least some challenges that may arise from the first IP and the second IP including components that operate at different clock frequencies, such as received from different clock sources asynchronously. For example, because both the first IP and the second IP receive the same clock signal from the clock management circuit 270 (e.g., ULPCLK), challenges in cross-boundary signaling between the first IP and the second IP may be mitigated and interoperability of the first IP and the second IP may be increased.

In an example, as shown in FIG. 2, ULPCLK 281 is switched between clock signals having three different clock frequencies. The clock signals include a high clock frequency signal (SYSCLK) 282 having a high clock frequency, a middle clock frequency signal (MFCLK) 283 having a middle clock frequency, and a low clock frequency signal (LFCLK) 284 having a low clock frequency. In some examples, SYSCLK 282 has a clock frequency equal to approximately 20 megahertz (MHz), MFCLK 283 has a clock frequency equal to approximately 2 MHz, and LFCLK 284 has a clock frequency equal to approximately 32 kilohertz (kHz). In other examples, clock dividers (not shown) can be useful instead of oscillators to provide the clock frequency signals. For example, clock dividers may be useful to divide SYSCLK 282 to provide MFCLK 283 and LFCLK 284 but may increase an power consumption associated with providing MFCLK 283 and LFCLK 284 in comparison to providing MFCLK 283 and LFCLK 284 via dedicated oscillators.

The frequency signals are provided according to the frequency and power requirements of the processing system 10. Clock frequency selection circuit 271 selects between the input signals SYSCLK 282, MFCLK 283, and LFCLK 284 to use as the basis for ULPCLK 281 upon receiving a request from an IP. For example, the clock frequency of ULPCLK 281 can be switched by the clock frequency selection circuit 271 multiple times in the order of multiple clock frequency requests from the IPs. When requests for different frequencies are received, the FSM 272 arbitrates between the different frequencies to select one to use as the basis for ULPCLK 281. For example, responsive to a request from multiple IPs for clock signals at different frequencies, the clock frequency selection circuit 271, via the FSM 272, selects a highest frequency request from the IPs and provides one of SYSCLK 282, MFCLK 283, or LFCLK 284 as ULPCLK 281 such that ULPCLK 281 has a frequency to satisfy the highest frequency request. A remainder of the multiple IPs that request clock signals at lower frequencies than the frequency of ULPCLK 281 may derive internal clock signals based on ULPCLK 281 and MFCLK enable signal (MFTICK) 285 or a LFCLK enable signal (LFTICK) 286.

The clock switching circuit 22 provides MFTICK 285 and LFTICK 286 along with ULPCLK 281 from the clock frequency selection circuit 271 to indicate to the IPs a time to switch the internal clock frequency of the IPs to the clock frequency of ULPCLK 281. Couplings to provide ULPCLK 281, MFTICK 285, and LFTICK 286 from the clock switching circuit 22 to each of the timer 230, ADC 240, DAC 250, and one or more peripheral interfaces 260 (e.g., collectively "the IPs," or individually "an IP") are shown with respective arrows in FIG. 2.

The clock switching circuit 22 performs clock switching to mitigate signal timing glitches and reduce latency at the IPs. For example, in response to receiving a clock frequency request from an IP for the highest clock frequency, the clock switching circuit 22 may first select, at the clock frequency selection circuit 271, SYSCLK 282 to provide as ULPCLK 281. The clock switching circuit 22 may subsequently receive requests for other frequencies from the IPs and, in response, may switch to providing ULPCLK 281 based on MFCLK 283 or LFCLK 284. In some examples, the clock switching circuit 22 may receive requests for both the highest clock frequency (e.g., SYSCLK 282) and one of MFCLK 283 or LFCLK 284. In response, the clock switching circuit 22 may provide ULPCLK 281 based on SYSCLK 282, and an IP requesting the clock frequency of MFCLK 283 or LFCLK 284 may internally derive or generate that clock frequency based on ULPCLK 281 (e.g., at the frequency of SYSCLK 282) and MFTICK 285 or LFTICK 286. For example, the receiving IP may gate ULPCLK 281 according to MFTICK 285 or LFTICK 286 to generate an internal MF clock signal or an internal LF clock signal, respectively. In some examples, the gating is performed by an ICG included in the receiving IP.

The clock switching circuit 22 also synchronizes MFTICK 285 and LFTICK 286 with the clock cycles of ULPCLK 281 upon each clock switching. A clock cycle is a repeated time period of signal transitions between asserted high and low values and is determined by the clock frequency of the signal. For example, a higher clock frequency signal has a shorter clock cycle (e.g., period). The clock switching circuit 22 synchronizes MFTICK 285 and LFTICK 286 with the clock cycles of ULPCLK 281 by detecting and aligning the rising edge in the clock cycles of ULPCLK 281, MFTICK 285, and LFTICK 286 in time, as described in examples below. In response to an IP receiving ULPCLK 281 at a frequency other than a frequency requested by the IP, the IP is configured to generate an internal clock signal at the requested frequency according to the received ULPCLK 281 and the synchronized MFTICK 285 or LFTICK 286. Synchronizing the clock cycles of MFTICK 285 and LFTICK 286 with ULPCLK 281 mitigates signal timing glitches at the IP during clock switching. By providing SYSCLK 282 as ULPCLK 281 first, the clock cycles of MFTICK 285 and LFTICK 286 can be synchronized faster in comparison to switching ULPCLK 281 to MFCLK 283 or LFCLK 284, thereby reducing latency in clock switching at the IP.

Figure 3:
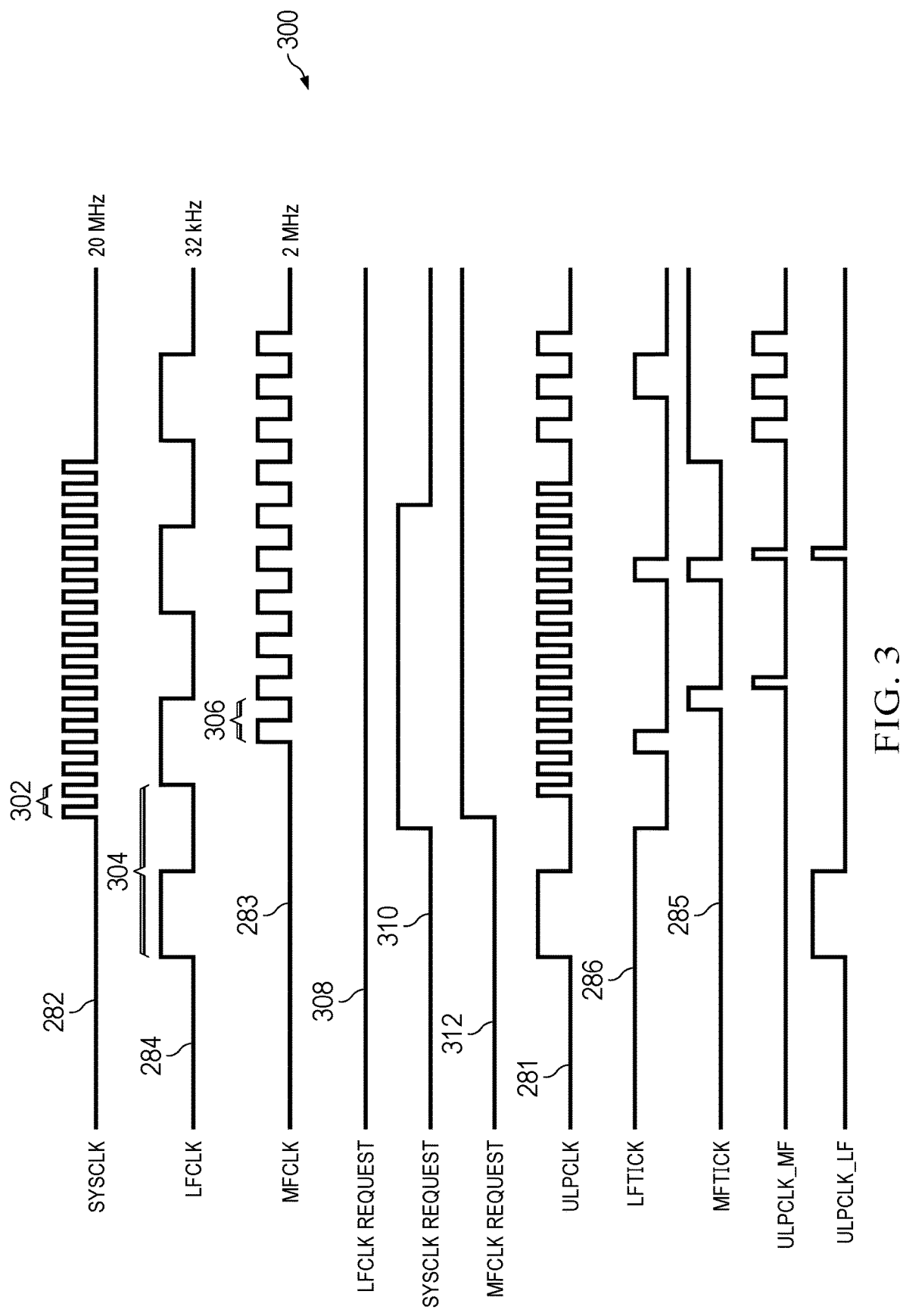
FIG. 3 is a diagram of signals for clock switching, in accordance with various examples.

FIG. 3 is a diagram of signals 300 for clock switching, in accordance with various examples. The signals 300 can be exchanged in the SoC/MCU 20 to perform clock switching for the IPs, such as by the clock switching circuit 22 as controlled by the FSM 272. The signals 300 include SYSCLK 282 having a first clock cycle 302 corresponding to a first clock frequency (e.g., about 20 MHz), LFCLK 284 having a second clock cycle 304 corresponding to a second clock frequency (e.g., about 32 kHz), and MFCLK 283 having a third clock cycle 306 corresponding to a third clock frequency (e.g., about 2 MHz). SYSCLK 282, LFCLK 284, and MFCLK 283 are provided by respective oscillators 273 to the clock switching circuit 22. Also shown in FIG. 3 are ULPCLK_MF and ULPCLK_LF. ULPCLK_MF has an average frequency approximately equal to the frequency of MFCLK 283 and represents an internally generated clock, such as may be generated by an ICG as described herein, based on received ULPCLK 281 and MFTICK 285. ULPCLK_LF has an average frequency approximately equal to the frequency of LFCLK 284 and represents an internally generated clock, such as may be generated by an ICG as described herein, based on received ULPCLK 281 and LFTICK 286. As shown in FIG. 3, the signals 300 are neither shown to scale nor shown with exact frequency ratios among the various signals of the signals 300 for waveform depiction of the principles of this disclosure.

The signals 300 include a first request signal (LFCLK request) 308 to request LFCLK 284, a second request signal (SYSCLK request) 310 to request SYSCLK 282, and a third request signal (MFCLK request) 312 to request MFCLK 283. LFCLK request 308, SYSCLK request 310, and MFCLK request 312 may be provided by a same IP at different times or by different IPs to the clock management circuit 270 to request clock signals at respective clock frequencies. In that regard, multiple instances of LFCLK request 308, SYSCLK request 310, and MFCLK request 312 may be received in examples with multiple independent IPs. The signals 300 also include ULPCLK 281, LFTICK 286, and MFTICK 285 as described above. The clock frequency selection circuit 271 selects, according to control signals provided by the FSM 272, one of SYSCLK 282, LFCLK 284, or MFCLK 283 for use as ULPCLK 281. The FSM 272 provides the control signals according to state transitions of the FSM 272 which determine the clock switching and control the selection by the clock frequency selection circuit 271 of ULPCLK 281.

For example, as shown in FIG. 3, SYSCLK 282, LFCLK 284, and MFCLK 283 are provided by the respective oscillators 273 to the clock frequency selection circuit 271. LFCLK request 308 may be previously set and maintained to an asserted high value in response to a request from an IP or the clock management circuit 270. Accordingly, ULPCLK 281 is previously set to the clock frequency of LFCLK 284 having the second clock cycle 304. In response to a new request for MFCLK 283 or SYSCLK 282 by the any IP or the clock management circuit 270, the clock switching circuit 22 switches ULPCLK 281 to SYSCLK 282 having the first clock cycle 302. A request for MFCLK 283 or SYSCLK 282 is indicated by setting MFCLK request 312 or SYSCLK request 310, respectively, to an asserted high value. After switching ULPCLK 281 to SYSCLK 282, the clock switching circuit 22 synchronizes LFTICK 286 and MFTICK 285 with ULPCLK 281 according to the clock frequency of SYSCLK 282. Synchronizing the signals includes aligning the rising edge in the different clock cycles of the different signals in time. Although not specifically shown in FIG. 3, the width of the clock cycles of LFTICK 286 and MFTICK 285 may match the width of the clock cycles of LFCLK 284 and MFCLK 283, respectively. If the received new request was for SYSCLK 282, no further action is taken. If the received new request was for MFCLK 283, after first switching ULPCLK 281 from LFCLK 284 to SYSCLK 282, MFCLK request 312 is set to or kept at an asserted high value and SYSCLK request 310 is set to an asserted low value. In this case, ULPCLK 281 is then switched from SYSCLK 282 to MFCLK 283. MFTICK 285 is also set to an asserted high value. Similar steps can be performed if ULPCLK 281 was previously set to MFCLK 283 and a request for SYSCLK 282 is received.

In another example not shown in FIG. 3, if ULPCLK 281 was previously set to MFCLK 283 and a new request for LFCLK 284 or SYSCLK 282 by any of the IPs or the clock management circuit 270 is received, the clock switching circuit 22 switches ULPCLK 281 to SYSCLK 282. A request for LFCLK 284 or SYSCLK 282 is indicated by setting LFCLK request 308 or SYSCLK request 310, respectively, to an asserted high value. After switching ULPCLK 281 to SYSCLK 282, the clock switching circuit 22 synchronizes LFTICK 286 and MFTICK 285 with ULPCLK 281 according to the clock frequency of SYSCLK 282. If the received new request was for SYSCLK 282, no further action is taken. If the received new request was for LFCLK 284, after first switching ULPCLK 281 from MFCLK 283 to SYSCLK 282, LFCLK request 308 is set to or kept at an asserted high value and SYSCLK request 310 is set to an asserted low value. In this case, ULPCLK 281 is then switched from SYSCLK 282 to LFCLK 284. LFTICK 286 is also set to an asserted high value and MFTICK 285 is set to an asserted low value. In an example, two IPs may request MFCLK 283 and LFCLK 284 independently. In this case, the highest requested clock frequency is provided with a clock frequency enable signal set for the lowest requested clock frequency. Accordingly, MFCLK request 312 is maintained at the asserted high value, and ULPCLK 281 is maintained set to MFCLK 283 and not switched to LFCLK 284. LFTICK 286 is also provided synchronous to MFCLK 283.

Switching ULPCLK 281 from LFCLK 284 to SYSCLK 282 and then to MFCLK 283, or from MFCLK 283 to SYSCLK 282 and then to LFCLK 284, allows faster synchronizing of the clocks cycles of MFTICK 285 with the clock cycles of ULPCLK 281, in comparison to switching ULPCLK 281 directly between LFCLK 284 to MFCLK 283. Synchronizing MFTICK 285 and LFTICK 286 with ULPCLK 281 according to the clock frequency of SYSCLK 282 avoids signal timing glitches at the IPs when performing clock switching. Switching ULPCLK 281 to SYSCLK 282, which has a faster setup time in comparison to MFCLK 283, reduces latency in clock switching at the IPs. For example, if SYSCLK 282 is equal to approximately 20 MHz, the setup time of SYSCLK 282 can be less than approximately 1 microsecond (us). If MFCLK 283 is equal to approximately 2 MHz, the setup time of MFCLK 283 can be equal to approximately 10 us. If LFCLK 284 is equal to approximately 32 kHz, the setup time of LFCLK 284 can be equal to approximately 1 millisecond (ms). The faster synchronization at the clock switching circuit 22 also reduces latency at the IPs when performing clock switching. For example, if ULPCLK 281 is switched directly from LFCLK 284 to MFCLK 283, synchronizing the clock cycles of MFTICK 285 with the clock cycles of ULPCLK 281 may take longer time due to the longer clock cycles of LFCLK 284 in comparison to SYSCLK 282. For example, the clock switching time from LFCLK 284 at approximately 32 kHz to MFCLK 283 at approximately 2 MHz or to SYSCLK 282 at approximately 20 MHz may be less than approximately 2 us. The state transitions of the FSM 272 for controlling the clock frequency selection circuit 271 in the clock switching circuit 22 may take less than approximately 10 to 20 clock cycles of the signals 300 including synchronization delay.

Figure 4:
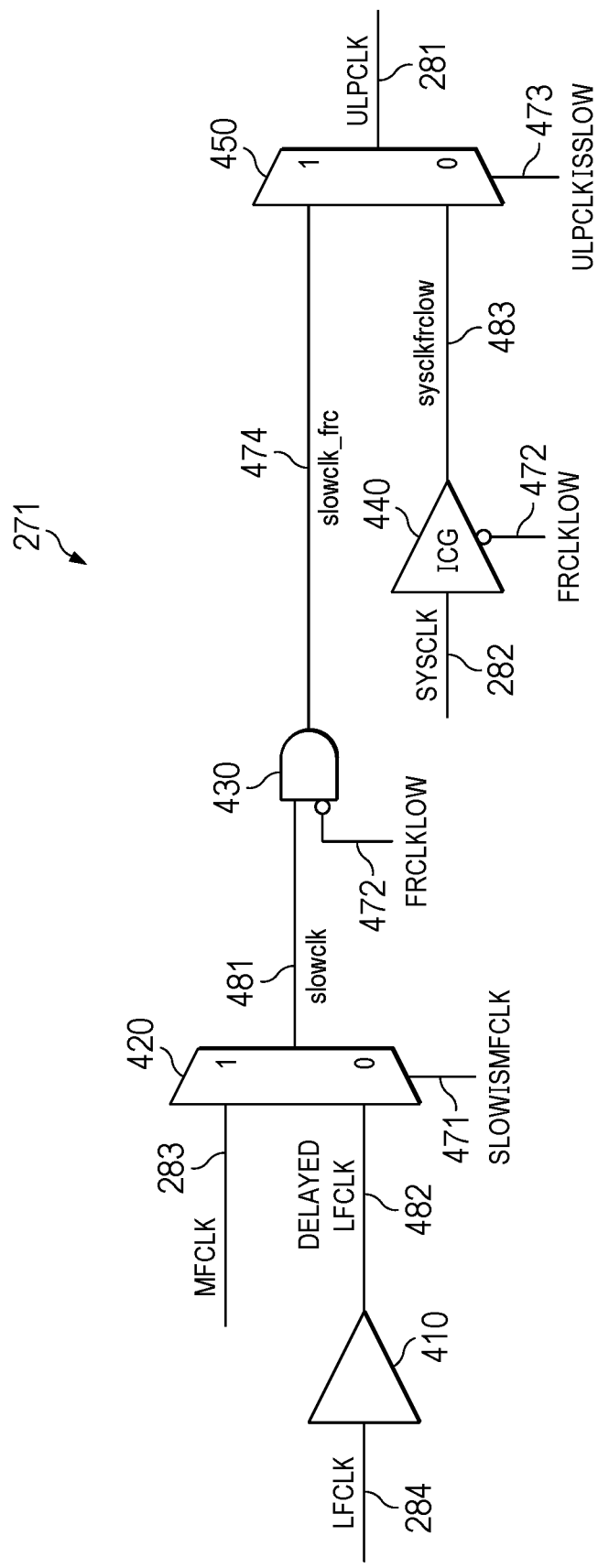
FIG. 4 is a diagram of a clock switching circuit, in accordance with various examples.

FIG. 4 is a diagram of the clock frequency selection circuit 271, in accordance with various examples. The clock frequency selection circuit 271 is configured to selectably provide ULPCLK 281 based on SYSCLK 282, LFCLK 284, or MFCLK 283 according to the state transitions of the FSM 272. The clock frequency selection circuit 271 may include a delay element 410 coupled to a first multiplexer 420 that is coupled to an AND gate 430, a ICG 440 coupled to a second multiplexer 450 that is also coupled to the AND gate 430. In some examples, the components of the clock frequency selection circuit 271 may be part of the clock switching circuit 22.

Although the FSM 272 is not shown in FIG. 4, the clock frequency selection circuit may operate at least partially under control of the FSM 272. For example, the FSM 272 may be configured by software, hardware, or both, at the clock management circuit 270 to provide control signals to the clock frequency selection circuit 271. The control signals determine the state transitions for selecting ULPCLK 281 at the clock frequency selection circuit 271. The control signals include a middle clock frequency slow indication signal (slowismfclk) 471 provided to the first multiplexer 420, a clock frequency signal low value signal (frcclklow) 472 provided to the AND gate 430 and the ICG 440, and an uplink primary clock frequency slow indication signal (ulpclkisslow) 473 provided to the second multiplexer 450. The values of the control signals provided by the FSM 272 provide state transitions that determine the clock switching at the clock frequency selection circuit 271.

To mitigate signal timing glitches in the clock switching, the FSM 272 can control the timing of the individual control signals to the respective elements of the clock frequency selection circuit 271 to provide a time delay of at least one clock cycle of SYSCLK 282 among the control signals. For example, if the clock frequency of SYSCLK 282 is approximately 20 MHz, the control signals slowismfclk, frcclklow, and ulpclkisslow, may be separated by a time delay of approximately 50 nanoseconds (ns).

The FSM 272 provides slowismfclk 471 to the first multiplexer 420 to cause the first multiplexer 420 to provide a slow clock frequency signal (slowclk) 481 as one of MFCLK 283 or a delayed representation of LFCLK (delayed LFCLK) 482 provided by the delay element 410. For example, slowismfclk 471 is set to an asserted high value to cause the first multiplexer 420 to provide slowclk 481 as MFCLK 283 or to an asserted low value to cause the first multiplexer 420 to provide delayed LFCLK 482 as slowclk 481. Delayed LFCLK 482 is provided by the delay element 410, which may be any suitable circuit element that causes a controllable or programmable delay, that delays LFCLK 284 by one or more clock cycles of SYSCLK 282. For example, if the clock frequency of SYSCLK 282 is approximately 20 MHz, LFCLK 284 may be delayed by approximately 140 ns. The FSM 272 provides frcclklow 472 to the AND gate 430 to provide slowclk_frc 474 based on slowclk 481 and frcclklow 472. In some examples, frcclklow 472 is provided to an inverting input of the AND gate 430, or an inverter (not shown) is placed in series between the FSM 272 and the AND gate 430 to invert a value of frcclklow 472 after output by the FSM 272 and prior to receipt by the AND gate 430. The AND gate 430 provides slowclk_frc 474 as an asserted value responsive to slowclk 481 having an asserted value and frcclklow 472 having a deasserted value. Similarly, the AND gate 430 provides slowclk_frc 474 having a deasserted value responsive to either slowclk 481 having a deasserted value or frcclklow 472 having an asserted value. The FSM 272 also provides frcclklow 472 to the ICG 440 to cause the ICG 440 to gate SYSCLK 282 according to frcclklow 472 to provide SYSCLK 282 as a system clock frequency signal low value indication signal (sysclkfrclow) 483 to the second multiplexer 450. In some examples, frcclklow 472 is provided to an inverted gate input of the ICG 440, or an inverter (not shown) is placed in series between the FSM 272 and the ICG 440 to invert a value of frcclklow 472 after output by the FSM 272 and prior to receipt by the ICG 440. Accordingly, the ICG 440 provides SYSCLK 282 as sysclkfrclow 483 responsive to frcclklow 472 having an asserted low value. The FSM 272 provides ulpclkisslow 473 to the second multiplexer 450 to cause the second multiplexer 450 to provide ULPCLK 281 as one of slowclk_frc 474 or sysclkfrclow 483. For example, ULPCLK 281 is set to a value of slowclk_frc 474 responsive to ulpclkisslow 473 having an asserted high value. Similarly, ULPCLK 281 is set to a value of sysclkfrclow 483 responsive to ulpclkisslow 473 having a deasserted value In an example, the FSM 272 controls an oscillator 273, as shown and described with reference to FIG. 2, that provides SYSCLK 282 to turn off after switching ULPCLK 281 from SYSCLK 282 to MFCLK 283 or LFCLK 284 and synchronizing LFTICK 286 and MFTICK 285 with ULPCLK 281, thereby saving power in the SoC/MCU 20. The FSM 272 also controls the oscillator 273 to turn on responsive to receipt of a clock switching request, such as to switch ULPCLK 281 from LFCLK 284 to MFCLK 283 or from MFCLK 283 to LFCLK 284.

Figure 5:
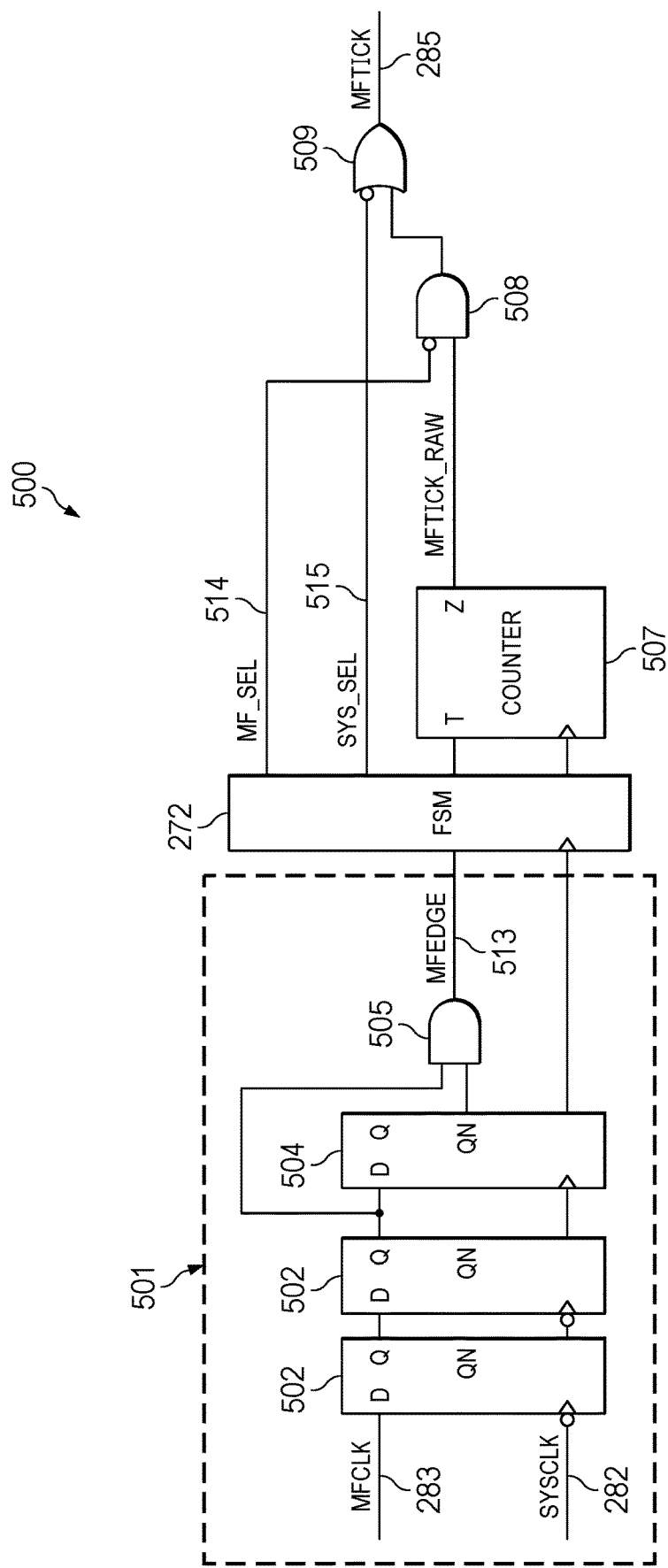
FIG. 5 is a diagram of a clock switching circuit, in accordance with various examples.

FIG. 5 is a diagram of a clock switching circuit 500, in accordance with various examples. The clock switching circuit 500, which may be part of the clock switching circuit 22, is configured to provide MFTICK 285 in a synchronous manner with the clock cycles of ULPCLK 281 according to the clock frequency of SYSCLK 282. The clock switching circuit 500 may include a rising edge detection circuit 501 coupled to the FSM 272. The rising edge detection circuit 501 includes first delay elements 502, a second delay element 504 coupled to the first delay elements 502, and a AND gate 505 coupled to the second delay element 504. Although two first delay elements 502 are shown in FIG. 5, in various examples any suitable nonzero number of first delay elements 502 may be included in the rising edge detection circuit 501. In some examples, the first and second delay elements 502 and 504 may be flip-flops or latches. The clock switching circuit 500 may also include a counter 507 coupled to the FSM 272, an AND gate 508 coupled to the FSM 272 and the counter 507, and an OR gate 509 coupled to the AND gate 508 and the FSM 272.

The rising edge detection circuit 501 is configured to detect rising edges of MFCLK 283 and provide a MFCLK rising edge indication signal (MFEDGE) 513 in response. In at least some examples, MFEDGE 513 may be useful in providing MFTICK 285 in a synchronous manner with SYSCLK 282. The first and second delay elements 502 and 504 of the rising edge detection circuit 501 provide MFCLK 283 that is synchronized with SYSCLK 282 based on detecting the rising edge of MFCLK 283. The AND gate 505 provides MFEDGE 513 to the FSM 272 based on MFCLK 283, as provided by the first delay elements 502, and an inverted representation of MFCLK 283, as provided by the second delay element 504. The FSM 272 provides MFEDGE 513 and SYSCLK 282 to the counter 507 as data and clock inputs, respectively. The counter 507 is configured to provide a MFTICK_RAW to the AND gate 508. In some examples, the counter 507 is programmable to provide MFTICK_RAW a programmed number of clock cycles of SYSCLK 282 after a time of detecting a rising edge in MFEDGE 513. This provides MFTICK_RAW in a synchronous manner with SYSCLK 282. The number of clock cycles of the counter 507 can be proportional to the ratio of the clock frequency of SYSCLK 282 to the clock frequency of MFCLK 283. For example, the number of clock cycles may be equal to approximately 10 if the clock frequency of SYSCLK 282 is equal to approximately 20 MHz and the clock frequency of MFCLK 283 is equal to approximately 2 MHz.

The FSM 272 provides a MFCLK select signal (MF_SEL) 514 and a SYSCLK select signal (SYS_SEL) 515, which may be useful for providing MFTICK 285. MF_SEL 514 is provided to the AND gate 508. In some examples, MF_SEL 514 is provided to an inverted input of the AND gate 508, or an inverter (not shown) is placed in series between the FSM 272 and the AND gate 508 to invert a value of MF_SEL 514 after output by the FSM 272 and prior to receipt by the AND gate 508. SYS_SEL 515 and an output of the AND gate 508 are provided to the OR gate 509. In some examples, SYS_SEL 515 is provided to an inverted input of the OR gate 509, or an inverter (not shown) is placed in series between the FSM 272 and the OR gate 509 to invert a value of SYS_SEL 515 after output by the FSM 272 and prior to receipt by the OR gate 509. The OR gate 509 provides MFTICK 285 based on a performing an OR logical operation between SYS_SEL 515 (or the inverted representation of SYS_SEL 515) and the output of the AND gate 508.

Figure 6:
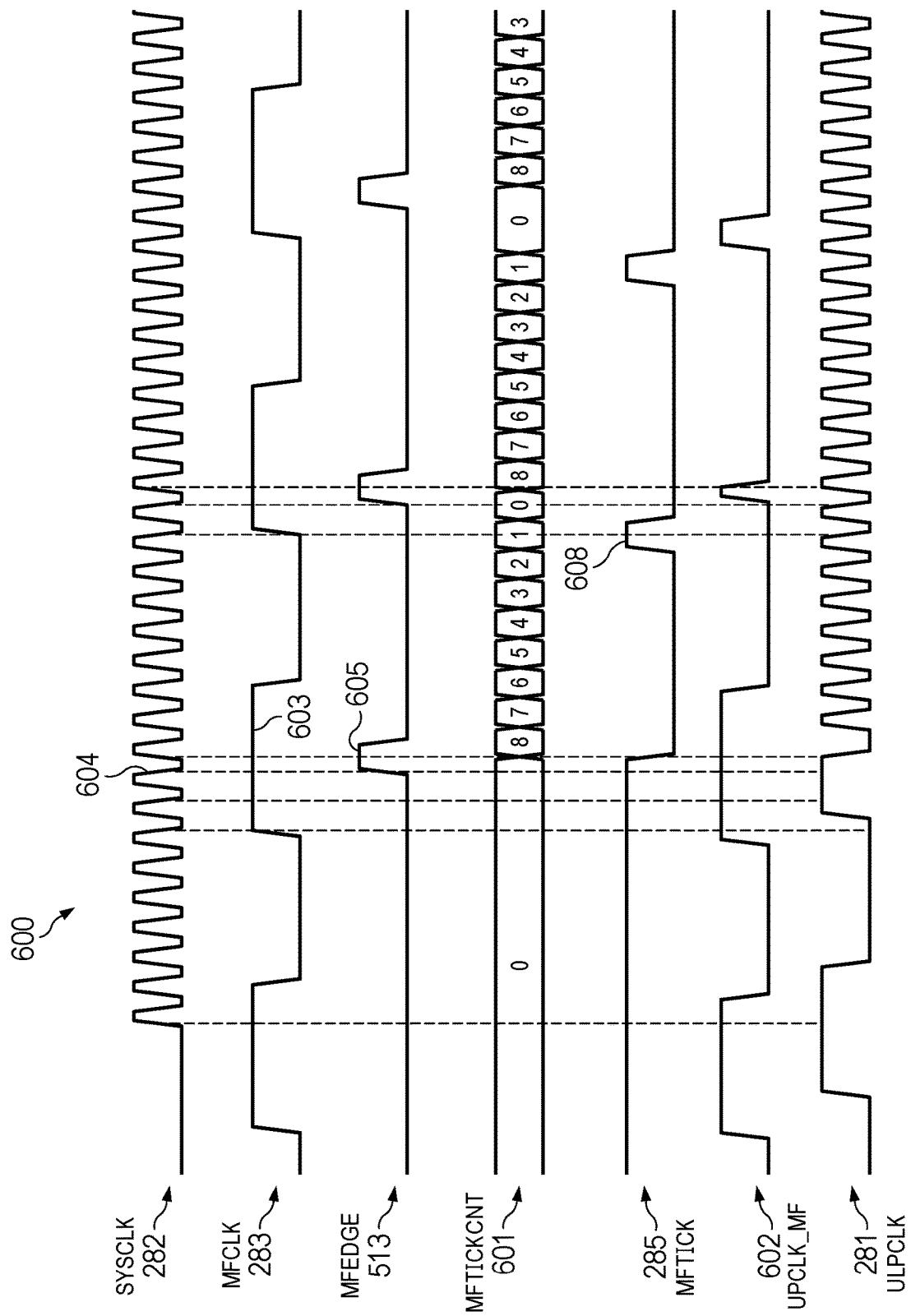
FIG. 6 is a diagram of signals for clock switching, in accordance with various examples.

FIG. 6 is a diagram of signals 600 for clock switching, in accordance with various examples. The signals 600 include signals that can be exchanged in the clock switching circuit 500 to perform clock switching for the IPs. In at least some examples, the signals shown in FIG. 6 include signals useful for providing MFTICK 285. The signals 600 include SYSCLK 282, MFCLK 283, MFEDGE 513, a MFTICK counter signal (MFTICKCNT) 601 of the counter 507, MFTICK 285, and ULPCLK 281 (shown in FIG. 6 as switching from MFCLK 283 to SYSCLK 282). The signals 600 also include ULPCLK_MF, as described above. In describing the signals 600, reference may be made to components of various prior figures of this description, such as components that may provide or receive the signals being described.

The rising edge detection circuit 501 provides MFEDGE 513 after detecting a MFCLK 283 asserted high value 603, as described above. The rising edge detection circuit 501 may also align MFEDGE 513 to start in time with a SYSCLK falling edge 604. The rising edge detection circuit 501 provides MFEDGE 513 to the FSM 272, which provides MFEDGE 513 to the counter 507. Responsive to detecting the MFEDGE 513 asserted high value 605, the counter 507 starts a countdown that is set to a programmed time period. For example, the countdown time period may be approximately equal to 9 clock cycles of SYSCLK 282. The 9 clock cycles of the countdown time period are based on the ratio of 20 MHz to 2 MHz of SYSCLK 282 and MFCLK 283, respectively, and considering approximately two clock cycles for additional clock switching delays in the clock switching circuit 500. More generally, the countdown may be programmed to begin at a value of X-Y, where X is a whole number representation of a ratio of frequencies between SYSCLK 282 and MFCLK 283 and Y is an estimated number of clock cycles for synchronization in the clock switching circuit 500. Responsive to a value of MFTICKCNT 601 being asserted (e.g., "1"), MFTICK 285 is asserted. The assertion of MFTICK 285 enables an ICG of the receiving IP to provide ULPCLK_MF according to ULPCLK 281 and MFTICK 285, each as shown in FIG. 6. Responsive to the value of MFTICKCNT 601 reaching 0, MFTICK 285 is deasserted. Based on ULPCLK 281 and MFTICK 285, MFCLK_TICK 602 may be provided. For example, the receiving IP may clock ULPCLK 281 according to MFTICK 285, such as via an ICG as described above, to provide MFCLK_TICK 602 having an average frequency approximately equal to that of MFCLK 283.

Figure 7:
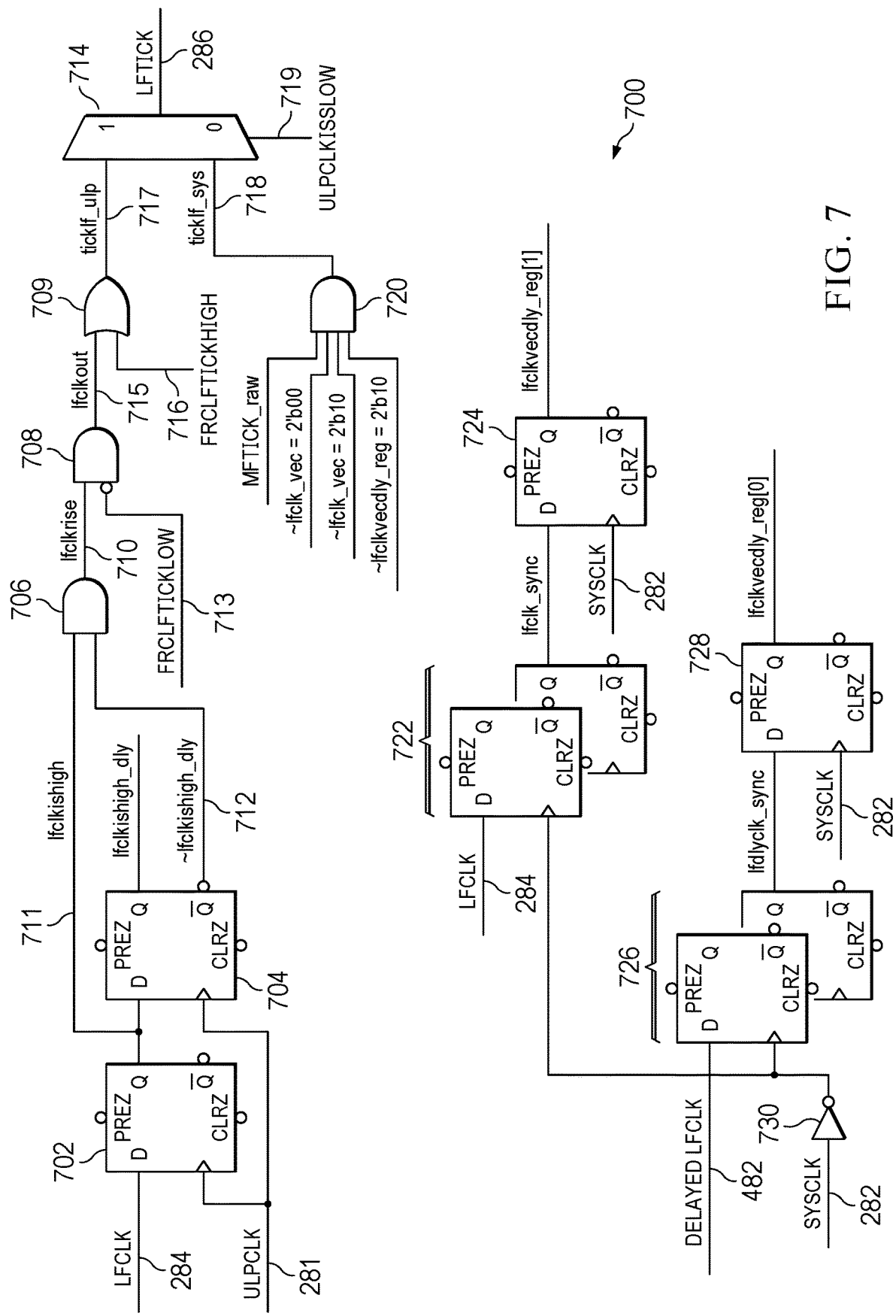
FIG. 7 is a diagram of a clock switching circuit, in accordance with various examples.

FIG. 7 is a diagram for clock switching circuit 700 in accordance with various examples. The clock switching circuit 700, which may be part of the clock switching circuit 22, is configured to provide LFTICK 286 in a synchronous manner with the clock cycles of ULPCLK 281 according to the clock frequency of SYSCLK 282. Because the clock frequency of LFCLK 284 (e.g., about 32 kHZ) may be substantially slower than the clock frequency of SYSCLK 282 (e.g., about 20 MHZ), LFTICK 286 can be provided in a synchronous manner with ULPCLK 281 when ULPCLK 281 is switched to SYSCLK 282 in the clock switching circuit 700 without a countdown time period of clock cycles of SYSCLK 282. The clock switching circuit 700 can delay or force LFTICK 286 to an asserted low or high value based on edge detection of LFCLK 284 to avoid signal timing glitches, which may be caused by signal transitions of ULPCLK 281 and LFTICK 286 based on LFCLK 284.

In some examples, the clock switching circuit 700 includes a delay element 702, a delay element 704, an AND gate 706, an AND gate 708, an OR gate 709, an AND gate 720, and a multiplexer 714, each coupled as shown in FIG. 7. The clock switching circuit 700 also includes delay elements 722, a delay element 724, delay elements 726, a delay element 728, and an inverter 730, each coupled as shown in FIG. 7. While two delay elements 722 and two delay elements 726 are shown in FIG. 7, in various examples any suitable number may be selected for the delay elements 7222 and the delay elements 726, provided that the same number of delay elements are selected for both the delay elements 722 and the delay elements 726.

The delay elements 702 and 704 with the AND gate 706 are configured to detect rising edges of delayed LFCLK 482 and provide a LFCLK rising edge indication signal (lfclkrise) 710. The delay element 702 provides a LFCLK asserted high value indication signal (lfclkishigh) 711 and the delay element 704 provides an inverted delayed LFCLK asserted high value indication signal (~lfclkishigh_dly) 712 to the AND gate 706. Based on lfclkishigh 711 and ~lfclkishigh_dly 712, the AND gate 703 provides lfclkrise 710.

The first and second delay elements 702 and 704 provide lfclkishigh 711 and ~lfclkishigh_dly 712 based LFCLK 284 and ULPCLK 281.

The AND gate 706 provides lfclkrise 710 having an asserted high value if both lfclkishigh 711 and ~lfclkishigh_dly 712 have asserted high values. The AND gate 708 provides an output LFCLK rising edge indication signal (lfclkout) 715 based lfclkrise 710 and a LFTICK asserted low value indication signal (frclkticklow) 713, which may be provided by the FSM 272. In some examples, frclkticklow 713 is provided to an inverting input of the AND gate 708, or an inverter (not shown) is placed in series between the FSM 272 and the AND gate 708 to invert a value of frclkticklow 713 after output by the FSM 272 and prior to receipt by the AND gate 708. Accordingly, the AND gate 708 provides lfclkout 715 having an asserted high value if lfclkrise 710 has an asserted high value and frclkticklow 713 has an asserted low value. The OR gate 709 provides a first low clock frequency enable signal (ticklf_ulp) 717 synchronized with clock cycles of ULPCLK 281 based lfclkout 715 and a LFTICK asserted high value indication signal (frclktickhigh) 716, which may be provided by the FSM 272. The OR gate 705 provides ticklf_ulp 717 having an asserted high value if either lfclkout 715 or frclktickhigh 716 has an asserted high value. The multiplexer 714 provides LFTICK 286 based on ticklf_ulp 717 and a second low clock frequency enable signal (ticklf_sys) 718 synchronized with clock cycles of SYSCLK 282. An uplink primary clock frequency slow indication signal (ulpclkisslow) 719 is provided to the multiplexer 714, such as by the FSM 272, to cause the multiplexer 714 to select ticklf_ulp 717 or ticklf_sys 718 to provide LFTICK 286. For example, the multiplexer 714 provides LFTICK 286 as having a value of ticklf_ulp 717 responsive to ulpclkisslow 719 having an asserted high value.

The AND gate 720 provides ticklf_sys 718 based on performing an AND logical operation between MFTICK_RAW, as described above with respect to FIG. 5, a signal indicating that ~lfclk_vec is equal to 2'b00, a signal indicating that ~lfclk_vec is equal to 2'b10, and a signal indicating that ~lfclkvecdly_reg is equal to 2'b10. In some examples, the signal indicating that ~lfclk_vec is equal to 2'b00 is determined according to a logical operation of NOT{(NOT lfclk_vec[1]) AND (NOT lfclk_vec[0])}. The logical operation may be performed by any suitable software or hardware implementation (not shown). In some examples, the signal indicating that ~lfclk_vec is equal to 2'b10 is determined according to a logical operation of NOT{lfclk_vec[1] AND (NOT lfclk_vec[0])}. The logical operation may be performed by any suitable software or hardware implementation (not shown). In some examples, the signal indicating that ~lfclkvecdly_reg is equal to 2'b10 is determined according to a logical operation of NOT{lfclkvecdly_reg[1] AND (NOT lfclkvecdly_reg[0])}. The logical operation may be performed by any suitable software or hardware implementation (not shown). In some examples, the delay elements 722 are clocked by an inverted representation of SYSCLK 282, as provided by the inverter 730, to provide lfclk_vec[1] based on delaying LFCLK 482. The delay element 724 provides lfclkvecdly_reg[1] based on lfclk_vec[1] and clocking according to SYSCLK 282. The delay elements 726 are clocked by the inverted representation of SYSCLK 282 to provide lfclk_vec[0] based on further delaying delayed LFCLK 482 (e.g., such as provided by the delay element 410 of FIG. 4). The delay element 728 provides lfclkvecdly_reg[0] based on lfclk_vec[0] and clocking according to SYSCLK 282.

Figure 8:
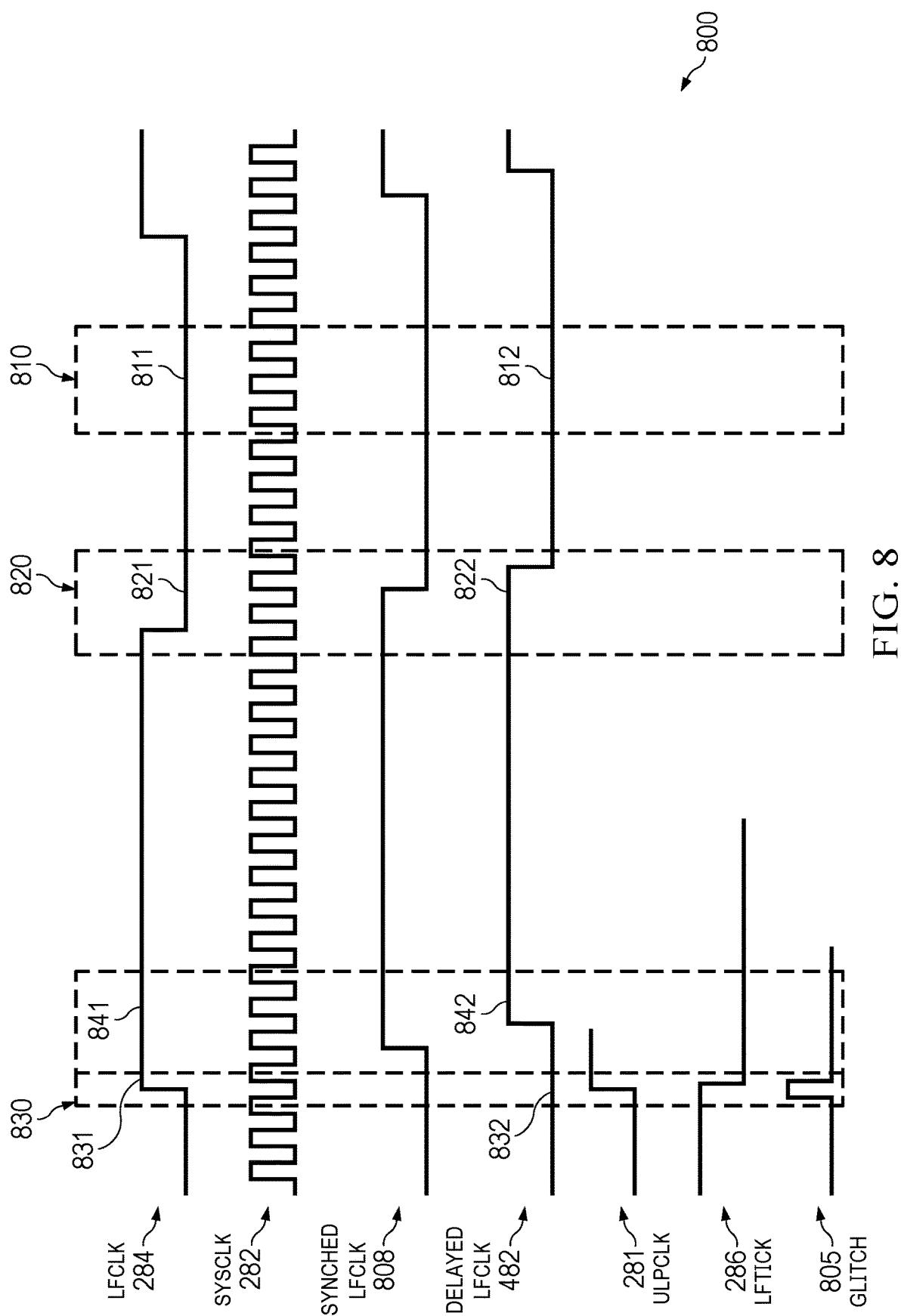
FIG. 8 is a diagram showing signal relations between signal transitions and glitching, in accordance with various examples.

FIG. 8 is a diagram showing signal relations 800 between signal transitions and glitching, in accordance with various examples. When switching ULPCLK 281 from LFCLK 284 to SYSCLK 282, the signal transitions may include a rising edge of LFCLK 284 that can cause a timing glitch at an IP. For example, a glitch 805 can occur at the IP responsive to ULPCLK 281 and LFTICK 286 both being received having asserted high values. As shown in FIG. 8, before switching ULPCLK 281 to SYSCLK 282, ULPCLK 281 may transition to an asserted high value with LFCLK 284. The rising edge of ULPCLK 281 may occur before synchronizing LFCLK 284 with SYSCLK 282 to provide a synchronized LFCLK (synched LFCLK) 808. For example, synched LFCLK 808 can transition to an asserted high value after one or more clock cycles of SYSCLK 282 from LFCLK 284. Because ULPCLK 281 is transitioned with LFCLK 284 instead of synched LFCLK 808, LFTICK 286 may be forced by the FSM 272 to an asserted low value after ULPCLK 281 transitions to an asserted high value. This can cause the IP to simultaneously receive ULPCLK 281 and LFTICK 286 at an asserted high value, thereby causing the glitch 805.

To avoid a glitch, the FSM 272 is configured to provide LFTICK 286 in a manner that does not cause the glitch 805 at the IP. The timing to provide the LFTICK 286 is based on predicting a rising edge of LFCLK 284. The FSM 272 can be configured to provide LFTICK 286 according to four cases of signal relations 800 based on the signal values of LFCLK 284 and delayed LFCLK 482. Delayed LFCLK 482 can be delayed more than approximately two clock cycles of SYSCLK 282, such as a delay of approximately 140 ns by the delay element 410, to predict a transition time of synched LFCLK 808.

The four cases monitored by the FSM 272 and logic (e.g., the AND gate 720) of the clock switching circuit 700 include a first case 810 when both LFCLK 284 and delayed LFCLK 482 are detected at asserted low values 811 and 812, respectively. In this case, no current transition in synched LFCLK 808 is predicted, and LFTICK 286 can be provided with ULPCLK 281 from the clock frequency selection circuit 271 to the IP without causing a glitch. A second case 820 is when an asserted low value 821 of LFCLK 284 is detected with an asserted high value 822 of delayed LFCLK 482. In this case, there is no current rising edge in LFCLK 284 to cause a glitch, and LFTICK 286 can also be provided with ULPCLK 281 from the clock frequency selection circuit 271 to the IP.

In a third case 830, when a rising edge or an asserted high value 831 of LFCLK 284 is detected with an asserted low value 832 of delayed LFCLK 482, an upcoming transition or rising edge for synched LFCLK 808 is predicted. In this case, when LFTICK 286 is provided with ULPCLK 281 to the IP, the glitch 805 may occur. To avoid a glitch, the FSM 272 does not provide LFTICK 286 to the IP at this time. For example, the FSM 272 is configured to delay providing LFTICK 286 to the IP for at least one or two clock cycles of SYSCLK 282. The delay in providing LFTICK 286 can avoid receiving simultaneously both ULPCLK 281 and LFTICK 286 at an asserted high value at the IP. In other examples, when the third case 830 occurs, the FSM 272 forces LFTICK 286 to transition to an asserted low value before ULPCLK 281 transitions to an asserted high value which avoids causing the glitch 805 at the IP.

A fourth case is when both LFCLK 284 and delayed LFCLK 482 are detected at asserted high values 841 and 842, respectively. This indicates that a rising edge of synched LFCLK 808 has previously occurred, and no current condition for glitching is detected at the IP. In this case, LFTICK 286 can also be provided with ULPCLK 281 from the clock frequency selection circuit 271 without causing a glitch. Table 1 below describes the four cases for configuring the FSM 272 to provide LFTICK 286 in a manner that does not cause a glitch in a clock signal at the IP. The FSM 272 can determine providing LFTICK 286 at the output of the multiplexer 714 in the clock switching circuit 700.

TABLE 1

| LFCLK | Delayed LFCLK | Action |
|---|---|---|
| 0 | 0 | provide LFTICK |
| 0 | 1 | provide LFTICK |
| 1 | 0 | delay LFTICK until a next clock cycle of SYSCLK or force LFTICK to an asserted low value |
| 1 | 1 | provide LFTICK |

Figure 9:
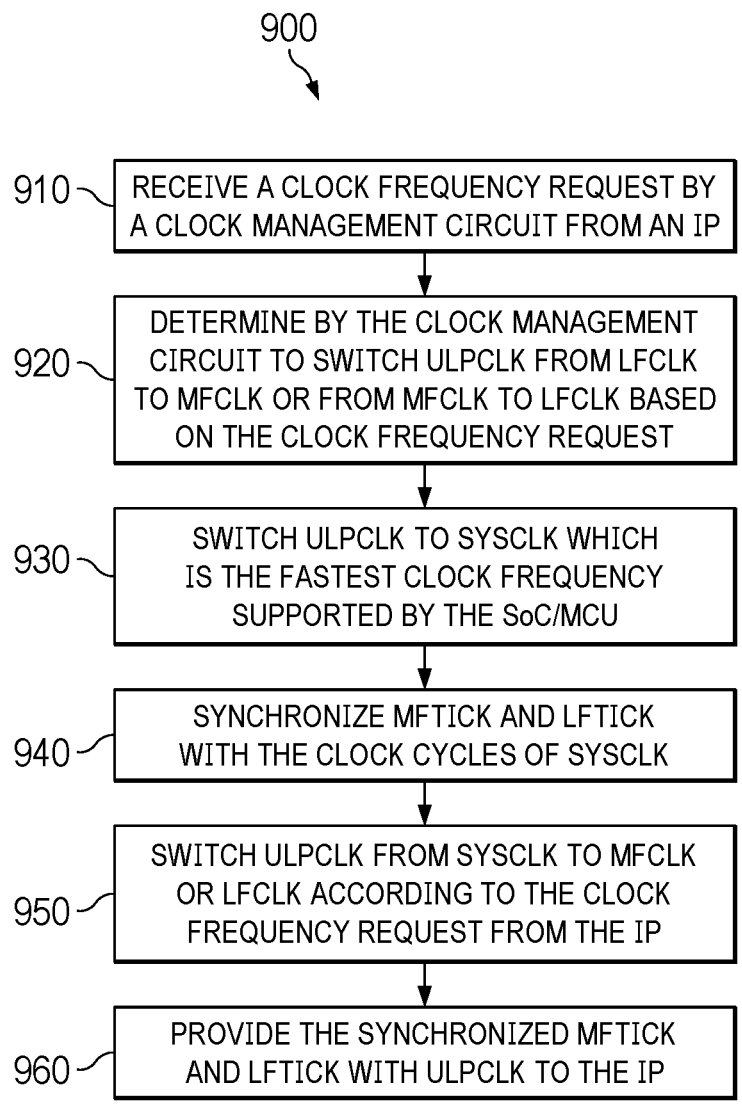
FIG. 9 is a flow diagram of a method for clock switching, in accordance with various examples.

FIG. 9 is a flow diagram of a method 900 for clock switching, in accordance with various examples. The method 900 may be performed by the clock switching circuit 22 to switch the clock frequency of ULPCLK 281 according to a clock frequency request from an IP, and synchronize MFTICK 285 and LFTICK 286 with the clock cycles of ULPCLK 281. At step 910, a clock frequency request is received by the clock management circuit 270 from an IP. For example, the clock frequency request is received from any of the IPs of the SoC/MCU 20 to request a clock frequency of one of SYSCLK 282, MFCLK 283, or LFCLK 284. At step 920, the clock management circuit 270 determines to switch ULPCLK 281 from LFCLK 284 to MFCLK 283 or from MFCLK 283 to LFCLK 284 based on the clock frequency request. At step 930, ULPCLK 281 is switched to SYSCLK 282, which is the fastest clock frequency supported by the SoC/MCU 20. For example, ULPCLK 281 is switched by the clock switching circuit 400 from LFCLK 284 to SYSCLK 282 regardless of the requested clock frequency. At step 940, MFTICK 285 and LFTICK 286 are synchronized with the clock cycles of SYSCLK 282. The synchronization is performed by aligning a rising edge of MFTICK 285 and LFTICK 286 according to a timing of a clock cycle or a rising edge of SYSCLK 282. For example, MFTICK 285 is synchronized with the clock cycles of SYSCLK 282 by the clock switching circuit 500, and LFTICK 286 is synchronized with the clock cycles of SYSCLK 282 by the clock switching circuit 700. At step 950, ULPCLK 281 is switched from SYSCLK 282 to MFCLK 283 or LFCLK 284 according to the clock frequency request from the IP. At step 960, the synchronized MFTICK 285 and LFTICK 286 are provided with ULPCLK 281 to the IP.

Figure 10:
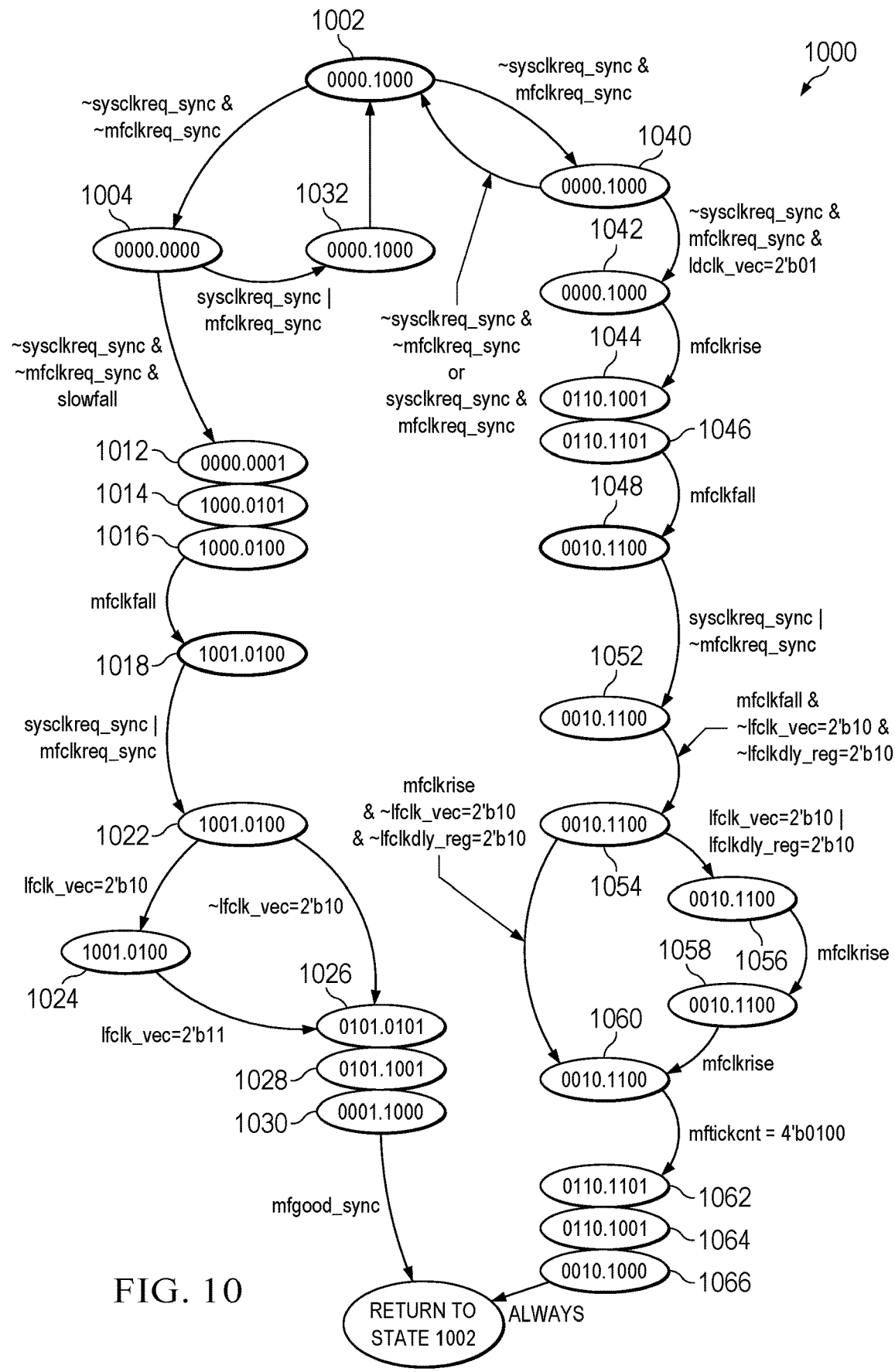
FIG. 10 is a state diagram suitable for implementation by a state machine in accordance with various examples.

FIG. 10 is a state diagram 1000 suitable for implementation by a state machine in accordance with various examples. In some examples, the state machine is the FSM 272. The state machine may operate and transition between states at least partially according to the signals and relationships shown in the state diagram 1000. Based on these transitions, the state machine may control a clock selection circuit, such as the clock frequency selection circuit 271, to provide a clock signal or clock signals to other circuits. For example, the state machine may receive requests from various IPs, as described herein, that may be requests for clock signals having the frequency of SYSCLK 282, LFCLK 284, or MFCLK 283. As shown in FIG. 10, a request from an IP to receive a clock signal having a frequency of SYSCLK 282 is represented as sysclkreq_sync and a request from an IP to receive a clock signal having a frequency of MFCLK 283 is shown as mfclkreq_sync. A tilde (~) preceding a variable name means a logical NOT function. Thus, ~ preceding a variable name indicates that the variable has a de-asserted value, such as a value of logical zero.

As shown in FIG. 10, each state of the state diagram 1000 corresponds to a control signal provided based on the state machine. In FIG. 10 the control signal is shown as an 8-bit control signal, indexed from bit 0 to bit 7 in a right to left direction. However, in various implementations the control signal may include a greater number of bits, at least some of which correspond to functionality not described herein. The state machine may provide at least some bits of the control signal to various components of the clock selection circuit to cause the clock selection circuit to provide clock signals to the IPs. The bits of the control signal uniquely correspond to various control signals described herein, as shown below in Table 2.

TABLE 2

| Bit | Signal |
|---|---|
| 0 | frcclklow |
| 1 | frcclkhigh |
| 2 | ulpclkislow |
| 3 | slowismfclk |
| 4 | frcmfticklow |
| 5 | frcmftickhigh |
| 6 | frclfticklow |
| 7 | frelftickhigh |

At state 1002, the state machine controls the clock selection circuit to provide a clock signal, such as ULPCLK 281, having a frequency approximately equal to that of SYSCLK 282. State 1002 may be a reset state of the state machine, such that the state machine begins operation at state 1002 and the progresses through state transitions to other states of the state machine. Responsive to sysclkreq_sync and mfclkreq_sync each being received having de-asserted values (e.g., ~sysclkreq_sync and ~mfclkreq_sync), the state machine transitions to state 1004.

At state 1004, the state machine implements a delay. For example, the state 1004 may be a wait state in which the state machine allows the clock selection circuit time to settle or perform other actions or functions outside the scope of this disclosure. While shown as a single state, in some examples the state 1004 may instead be implemented as multiple, progressive states. Responsive to ~sysclkreq_sync and ~mfclkreq_sync and slowfall, the state machine transitions to state 1012. As used herein, slowfall indicates a falling edge detection in slowclk 481. Responsive to sysclkreq_sync or mfclkreq_sync, the state machine transitions to state 1032 and then to state 1002 after a programmed waiting time.

At state 1012, the state machine asserts frcclklow and transitions to state 1014. At state 1014, the state machine maintains the asserted value of frcclklow, asserts ulpclkisslow, asserts frclftickhigh, and transitions to state 1016. At state 1016 the state machine maintains the asserted values of ulpclkisslow and frclftickhigh and de-asserts frcclklow. Responsive to mfclkfall, the state machine transitions to state 1018. As used herein, mfclkfall indicates a falling edge detection in MFCLK 283.

At state 1018, the state machine controls the clock selection circuit to provide the clock signal having a frequency approximately equal to that of LFCLK 284. Also, the state machine maintains the asserted values of ulpclkisslow and frclftickhigh and also asserts frcmfticklow. In some examples, the state machine remains at state 1018 until receipt of sysclkreq_sync or mfclkreq_sync. Responsive to sysclkreq_sync or mfclkreq_sync, the state machine transitions to state 1022.

At state 1022, the state machine implements a delay. For example, the state 1022 may be a wait state in which the state machine allows the clock selection circuit time to settle or perform other actions or functions outside the scope of this disclosure. Responsive to lfclk_vec having a binary value of 2'b10 (e.g., a decimal value of 2), the state machine transitions to state 1024. Responsive to lfclk_vec not having a binary value of 2'b10 (e.g., not a decimal value of 2), the state machine transitions to state 1026.

At state 1024, the state machine implements a delay. For example, the state 1024 may be a wait state in which the state machine allows the clock selection circuit time to settle or perform other actions or functions outside the scope of this disclosure. Responsive to lfclk_vec having a binary value of 2'b11 (e.g., a decimal value of 3), the state machine transitions to state 1026.

At state 1026, the state machine maintains the asserted values of frcmfticklow and ulpclkisslow, de-asserts frclftickhigh, asserts frclfticklow, asserts frcclklow, and transitions to state 1028.

At state 1028, the state machine maintains the asserted values of frcmfticklow, frclfticklow, and frcclklow, de-asserts ulpclkisslow, asserts slowismfclk, and transitions to state 1030.

At state 1030 the state machine maintains the asserted values of frcmfticklow and slowismfclk, de-asserts frclfticklow, and de-asserts frcclklow. Responsive to receipt of mfgood_sync, the state machine transitions to state 1002. As used herein, mfgood_sync indicates than an oscillator of the oscillators 273 that provides MFCLK 283 is operating in a normal state.

Returning to state 1002, the state machine maintains slowismfclk in an asserted state and de-asserts frcmfticklow. Responsive to ~sysclkreq_sync and mfclkreq_sync, the state machine transitions to state 1040.

At state 1040, the state machine maintains the asserted value of slowismfclk and implements a delay. For example, the state 1040 may be a wait state in which the state machine allows the clock selection circuit time to settle or perform other actions or functions outside the scope of this disclosure. Responsive to ~sysclkreq_sync and ~mfclkreq_sync, or sysclkreq_sync and mfclkreq_sync, the state machine transitions to state 1002. Responsive to ~sysclkreq_sync and mfclkreq_sync and lfclk_vec having a binary value of 2'b01 (e.g., a decimal value of 1), the state machine transitions to state 1042.

At state 1042, the state machine maintains the asserted value of slowismfclk and implements a delay. For example, the state 1042 may be a wait state in which the state machine allows the clock selection circuit time to settle or perform other actions or functions outside the scope of this disclosure. Responsive to mfclkrise, the state machine transitions to state 1044. As used herein, mfclkrise indicates a rising edge detection in MFCLK 283.

At state 1044, the state machine maintains the asserted value of slowismfclk, asserts frclfticklow, asserts frcmftickhigh, asserts frcclklow, and transitions to state 1046. At state 1046, the state machine maintains the asserted value of slowismfclk, frclfticklow, frcmftickhigh, and frcclklow, and asserts ulpclkisslow. Responsive to mfclkfall, the state machine transitions to state 1048.

At state 1048, the state machine controls the clock selection circuit to provide the clock signal having a frequency approximately equal to that of MFCLK 283. Also, the state machine maintains the asserted value of slowismfclk, frclfticklow, and ulpclkisslow, and de-asserts frclfticklow and frcclklow. In some examples, the state machine remains at state 1048 until receipt of sysclkreq_sync or ~mfclkreq_sync. Responsive to sysclkreq_sync or ~mfclkreq_sync, the state machine transitions to state 1052.

At state 1052, the state machine implements a delay. For example, the state 1052 may be a wait state in which the state machine allows the clock selection circuit time to settle or perform other actions or functions outside the scope of this disclosure. Responsive to mfclkfall, lfclk_vec not having a binary value of 2'b10 (e.g., a decimal value of 2), and lfclkdly_reg not having a value of 2'b10 (e.g., a decimal value of 2), the state machine transitions to state 1054.

At state 1054, the state machine implements a delay. For example, the state 1054 may be a wait state in which the state machine allows the clock selection circuit time to settle or perform other actions or functions outside the scope of this disclosure. Responsive to lfclk_vec having a binary value of 2'b10 (e.g., a decimal value of 2) or lfclkdly_reg having a value of 2'b10 (e.g., a decimal value of 2), the state machine transitions to state 1056.

At state 1056, the state machine implements a delay. For example, the state 1056 may be a wait state in which the state machine allows the clock selection circuit time to settle or perform other actions or functions outside the scope of this disclosure. Responsive to mfclkrise, the state machine transitions to state 1058.

At state 1058, the state machine implements a delay. For example, the state 1058 may be a wait state in which the state machine allows the clock selection circuit time to settle or perform other actions or functions outside the scope of this disclosure. Responsive to mfclkrise, the state machine transitions to state 1060.

Returning to state 1054, responsive to mfclkrise, lfclk_vec not having a binary value of 2'b10 (e.g., a decimal value of 2), and lfclkdly_reg not having a value of 2'b10 (e.g., a decimal value of 2), the state machine transitions to state 1060.

At state 1060, the state machine implements a delay. For example, the state 1060 may be a wait state in which the state machine allows the clock selection circuit time to settle or perform other actions or functions outside the scope of this disclosure. Responsive to MFTICKCNT 601, as maintained and provided by the counter 507, having a binary value of 4'b0100 (e.g., a decimal value of 8), the state machine transitions to state 1062.

At state 1062, the state machine maintains frcmtickhigh, slowismfclk, and ulpclkisslow as having asserted values, asserts frclfticklow, asserts frcclklow, and transitions to state 1064. At state 1064, the state machine maintains frcmfticklow, slowismfclk, and frcclklow as having asserted values, de-asserts ulpclkisslow, and transitions to state 1066. At state 1066 the state machine maintains frmcmftickhigh and slowismfclk as having asserted values, de-asserts frclfticklow and frcclklow, and transitions to state 1002.

The state machine operating according to the states and transitions described above to provide control signals as shown in FIG. 10 and described herein provides clock signals to requesting devices, such as the IPs described herein. A clock signal provided by the clock selection circuit under control of the state machine may be at a frequency that is a highest frequency from among frequencies requested by the IPs. The clock selection circuit may further provide enable signals, such as MFTICK 285 and LFTICK 286 to requesting IPs. The requesting IPs may receive the clock signal provided under control of the state machine and, by further clocking the clock signal according to the enable signal (e.g., such as via an ICG, as described above herein), the IPs may derive lower frequency clock signals. However, because these lower frequency cock signals are derived by each requesting IP from a same clock signal provided under control of the state machine, at least some challenges related to exchanging signals across clock boundaries are mitigated.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more circuit elements (such as flip flops, latches, gates, multiplexers, counters, etc.) and/or one or more sources (such as voltage and/or current sources) may instead include the circuit elements within a single physical device (e.g., a semiconductor die and/or integrated circuit (IC) package) and may be adapted to be coupled to at least some of the circuit elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement.

Unless otherwise stated, "about," "approximately," or "substantially" preceding a value means +/−10 percent of the stated value. Modifications are possible in the described examples, and other examples are possible within the scope of the claims.

What is claimed is:

1. An apparatus, comprising:
   a clock switching circuit coupled to oscillators and one or more circuit units, the clock switching circuit configured to:
      receive, from the oscillators, a set of frequency signals;
      provide an uplink primary clock signal and an enable signal to the one or more circuit units, the enable signal determined synchronously with the uplink primary clock signal;
      receive, from the one or more circuit units or a clock management circuit, a clock frequency request;
      provide the uplink primary clock signal based on a first signal of the set of frequency signals; and
      according to the clock frequency request, determine whether to continue to provide the uplink primary clock signal based on the first signal or on a second signal of the set of frequency signals.

2. The apparatus of claim 1, further comprising a finite state machine (FSM) coupled to the clock switching circuit and configured to provide control signals for controlling the clock switching circuit for providing the uplink primary clock signal.

3. The apparatus of claim 2, wherein the clock switching circuit includes a clock frequency selection circuit configured to select, according to the control signals, the uplink primary clock signal from among the set of frequency signals.

4. The apparatus of claim 3, wherein the set of frequency signals includes a low clock frequency signal, a medium clock frequency signal, and a high clock frequency signal, the clock frequency selection circuit including:
   a delay element having a delay element input configured to receive the low clock frequency signal and a delay element output configured to provide a delayed low clock frequency signal;
   a first multiplexer having a first multiplexer first input, a first multiplexer second input, and a first multiplexer output, the first multiplexer first input configured to receive the middle clock frequency signal, the first multiplexer second input coupled to the delay element output, and the first multiplexer output configured to provide a slow clock frequency signal as one of the middle clock frequency signal or the delayed low clock frequency signal according to a middle clock frequency slow indication signal included among the control signals;
   an AND gate having an AND gate output, a first AND gate input, and a second AND gate input, the first AND gate input coupled to the first multiplexer output, the second AND gate input configured to receive an inverse of a clock frequency signal low value indication signal included among the control signals, and the AND gate output configured to provide an uplink primary clock multiplexer signal;
   an integrated clock gate (ICG), the ICG having an ICG data input, an ICG control input, and an ICG output, the ICG data input configured to receive the high clock frequency signal, the ICG control input configured to receive the clock frequency signal low value indication signal, and the ICG output configured to provide a system clock frequency signal low value indication signal; and
   a second multiplexer having a second multiplexer first input, a second multiplexer second input, and a second multiplexer output, the second multiplexer first input coupled to the AND gate output, the second multiplexer second input coupled to the ICG output, and the second multiplexer output configured to provide the uplink primary clock signal based on the uplink primary clock multiplexer signal, the system clock frequency signal low value indication signal, and an uplink primary clock frequency slow indication signal included among the control signals.

5. The apparatus of claim 3, wherein the clock switching circuit is configured to provide a second enable signal in a synchronous manner with clock cycles of a high clock frequency signal based on a middle clock frequency select signal and a high clock frequency select signal included among the control signals.

6. The apparatus of claim 5, wherein the clock switching circuit further includes a rising edge detection circuit coupled to the FSM and configured to detect a rising edge of the middle clock frequency signal, the second enable signal provided by the clock switching circuit based on the detected rising edge of the middle clock frequency signal, the rising edge detection circuit including:
  delay elements having a first delay element output configured to provide the middle clock frequency signal synchronous to the high clock frequency signal based on detecting the rising edge; and
  an AND gate coupled to the delay elements, the AND gate having a first AND gate output configured to provide to the FSM a middle clock frequency signal rising edge indication signal and a second AND gate output configured to provide the high clock frequency signal from the delay elements, the middle clock frequency signal rising edge indication signal sent based on detecting the rising edge of the middle clock frequency signal.

7. The apparatus of claim 6, wherein the clock switching circuit further includes:
  a digital counter coupled to the FSM, the digital counter having a first digital counter output configured to provide a second enable raw signal a number of clock cycles of the high clock frequency signal after receiving the middle clock frequency signal rising edge indication signal;
  a second AND gate having a second AND gate first input, a second AND gate second input, and a second AND gate output, the second AND gate first input coupled to the FSM and configured to receive an inverse of a middle clock frequency select signal included among the control signals and the second AND gate second input coupled to the digital counter output; and
  an OR gate having an OR gate first input, an OR gate second input, and an OR gate output, the OR gate first input coupled to the FSM and configured to receive a high clock frequency signal select signal from among the control signals, the OR gate second input coupled to the second AND gate output, and the OR gate output configured to provide the middle clock frequency select signal.

8. The apparatus of claim 7, wherein the number of clock cycles of the high clock frequency signal is proportional to a ratio of a first clock frequency of the high clock frequency signal to a second clock frequency of the middle clock frequency signal.

9. The apparatus of claim 1, wherein the set of frequency signals includes a low clock frequency signal, a medium clock frequency signal, and a high clock frequency signal, and wherein the clock switching circuit further includes:
  delay elements having a first delay element output configured to provide a low clock frequency signal high value indication signal and a second delay element output configured to provide a delayed low clock frequency signal high value indication signal;
  a first AND gate coupled to the delay elements, the first AND gate having a first AND gate output configured to provide a low clock frequency rising edge indication signal based on the low clock frequency signal high value indication signal and the delayed low clock frequency signal high value indication signal;
  a second AND gate coupled to the first AND gate, the second AND gate having a second AND gate output configured to provide an output low clock frequency signal rising edge indication signal based on the low clock frequency rising edge indication signal and an inverse of a low clock frequency signal low value indication signal;
  an OR gate coupled to the second AND gate and configured to receive a third enable signal high value indication signal, the OR gate having an OR gate output configured to provide a low clock frequency synchronized with the uplink primary clock signal; and
  a multiplexer coupled to the OR gate, the multiplexer having a multiplexer output configured to provide the low clock frequency enable signal based on the low clock frequency synchronized with clock cycles of the uplink primary clock signal, a low clock frequency synchronized with clock cycles of the high clock frequency signal, and an uplink primary clock signal low value indication signal.

10. A method, comprising:
receiving, by a clock management circuit, a clock frequency request from a circuit unit for a clock signal having a first frequency;
determining, by the clock management circuit based on the clock frequency request, to provide an uplink primary clock signal based on a first clock frequency signal from among a set of clock frequency signals, the first clock frequency signal having the first frequency;
receiving, by the clock management circuit, a second clock frequency request from a second circuit unit for a second clock signal having a second frequency;
responsive to the second frequency being less than the first frequency, determining, by the clock management circuit based on the second clock frequency request, to continue providing the uplink primary clock signal based on the first clock frequency signal;
responsive to the second frequency being greater than the first frequency, determining, by the clock management circuit based on the second clock frequency request, to provide the uplink primary clock signal based on a second clock frequency signal from among the set of clock frequency signals, the second clock frequency signal having the second frequency; and
providing the uplink primary clock signal and an enable signal to the circuit unit and the second circuit unit, the enable signal provided synchronously with the uplink primary clock signal.

11. The method of claim 10, including:
generating, by the circuit unit, a first internal clock signal having the first frequency based on the uplink primary clock signal and the enable signal responsive to the second frequency being greater than the first frequency; and
generating, by the second circuit unit, a second internal clock signal having the second frequency based on the uplink primary clock signal and the enable signal responsive to the second frequency being less than the first frequency.

12. The method of claim 10, including:
receiving, by the clock management circuit, a third clock frequency request from a third circuit unit for a third clock signal having a third frequency;
responsive to the third frequency being less than the first frequency and the second clock frequency, determining, by the clock management circuit, to continue providing the uplink primary clock signal based on a higher frequency from among the first clock frequency signal and the second clock frequency signal;

responsive to the third frequency being greater than the first frequency and the second frequency, determining, by the clock management circuit based on the third clock frequency request, to provide the uplink primary clock signal based on a third clock frequency signal from among the set of clock frequency signals, the third clock frequency signal having the third frequency; and providing the uplink primary clock signal, an enable signal, and a second enable signal to the circuit unit, the second circuit unit, and the second circuit unit, the enable signal and the second enable signal provided synchronously with the uplink primary clock signal.

13. The method of claim 12, wherein the first frequency is greater than the second frequency and the third frequency, the method including:

generating, by the second circuit unit, a second internal clock signal having the second frequency based on the uplink primary clock signal and the enable signal; and generating, by the third circuit unit, a third internal clock signal having the third frequency based on the uplink primary clock signal and the second enable signal.

14. The method of claim 12, wherein the third frequency is greater than the first frequency and the second frequency, the method including:

generating, by the circuit unit, a first internal clock signal having the first frequency based on the uplink primary clock signal and the enable signal; and generating, by the second circuit unit, a second internal clock signal having the second frequency based on the uplink primary clock signal and the second enable signal.

15. The method of claim 10, including:

providing, via respective oscillators, each frequency signal of the set of clock frequency signals, wherein the set of clock frequency signals includes a third clock frequency signal having a third frequency greater than the first frequency and the second frequency; and disabling an oscillator of the oscillators that provides the third clock frequency signal responsive to the third frequency being greater than the first frequency requested by the circuit unit and the second frequency requested by the second circuit unit.

16. The method of claim 10, further including responsive to providing the uplink primary clock signal based on the second clock frequency signal, disabling an oscillator that provides the first clock frequency signal.

17. An apparatus comprising:

a clock switching circuit; and a finite state machine (FSM) configured to:

provide first control signals to the clock switching circuit for state transitions that determine switching an uplink primary clock signal from a first clock frequency signal to a second clock frequency signal or a third clock frequency signal, the first clock frequency signal having a faster clock frequency than the second clock frequency signal, and the third clock frequency signal having a slower clock frequency than the second clock frequency signal; and provide second control signals to the clock switching circuit to provide a second clock frequency enable signal and a third clock frequency enable signal with the uplink primary clock signal, the second clock frequency enable signal and the third clock frequency enable signal generated synchronously with the uplink primary clock signal.

18. The apparatus of claim 17, wherein the FSM is configured to:

provide a second clock frequency slow indication signal to the clock switching circuit, the second clock frequency slow indication signal causing the clock switching circuit to provide a slow clock frequency signal from a delayed third clock frequency signal or the second clock frequency signal;

provide a clock frequency signal low value indication signal to the clock switching circuit to determine with the slow clock frequency signal an uplink primary clock multiplexer signal, the clock frequency signal low value indication signal causing the clock switching circuit to provide a system clock frequency signal low value indication signal based on a high clock frequency signal;

provide an uplink primary clock frequency slow indication signal to the clock switching circuit, the uplink primary clock frequency slow indication signal causing the clock switching circuit to provide an output clock frequency signal based on the uplink primary clock multiplexer signal and the system clock frequency signal low value indication signal; and provide the uplink primary clock multiplexer signal to the clock switching circuit, the uplink primary clock multiplexer signal causing the clock switching circuit to provide the uplink primary clock signal based on the output clock frequency signal and the high clock frequency signal.

19. The apparatus of claim 17, wherein the FSM is configured to provide an uplink primary clock frequency slow indication signal to the clock switching circuit, the uplink primary clock frequency slow indication signal causing the clock switching circuit to provide the third clock frequency enable signal as one of a first third clock frequency enable signal synchronized with clock cycles of the uplink primary clock signal and a second third clock frequency enable signal synchronized with clock cycles of a high clock frequency signal.

20. The apparatus of claim 17, wherein the FSM is configured to:

provide a second clock frequency select signal to the clock switching circuit, the second clock frequency select signal causing the clock switching circuit to select the second clock frequency signal; and provide a high clock frequency select signal to the clock switching circuit, the high clock frequency select signal causing the clock switching circuit to select the second clock frequency signal.

* * * * *